United States Patent [19]

Matsumoto et al.

[11] Patent Number: 5,802,381
[45] Date of Patent: Sep. 1, 1998

[54] TEXT EDITOR FOR CONVERTING TEXT FORMAT TO CORRESPOND TO AN OUTPUT METHOD

[75] Inventors: Fumitaka Matsumoto; Yasuko Toju, both of Nakai-machi, Japan

[73] Assignee: Fuji Xerox Co., Ltd., Tokyo, Japan

[21] Appl. No.: 603,391

[22] Filed: Feb. 20, 1996

[30] Foreign Application Priority Data

Feb. 21, 1995 [JP] Japan ................................. 7-055276

[51] Int. Cl.$^6$ ................................................. G06T 11/00
[52] U.S. Cl. ................................. 395/779; 395/773
[58] Field of Search ................................. 395/773–781, 395/799, 171, 326, 352, 356, 941, 942, 943, 948

[56] References Cited

U.S. PATENT DOCUMENTS 4,800,510  1/1989  Vinberg et al. .................. 395/140
5,293,473  3/1994  Hesse et al. ..................... 395/352 X Primary Examiner—Almis R. Jankus
Attorney, Agent, or Firm—Oliff & Berridge

[57] ABSTRACT

A text editor device provides for the automatic selection and execution corresponding to differences in the output form of text for emphasizing places of emphasis within the text, without the receipt of any indication from the user. The user calls out from the text data holding component data from the text which is the object of editing. While referring to text picture images corresponding to the text data through the text picture image display, input indication of locations requiring desired emphasis in the type of text output is made through the user input indication component. If emphasis input indication and output type input indication has been provided by the user, then from among the conversion rule group held in the conversion rule holding component, a conversion rule is called out corresponding to the output type indicated by the user. The text data conversion component, re-writes the text data, in accordance with the called out rule, and the newly generated text data is stored in text data holding component. The text data picture images corresponding to the new text data are provided to the user through a picture image display.

21 Claims, 43 Drawing Sheets

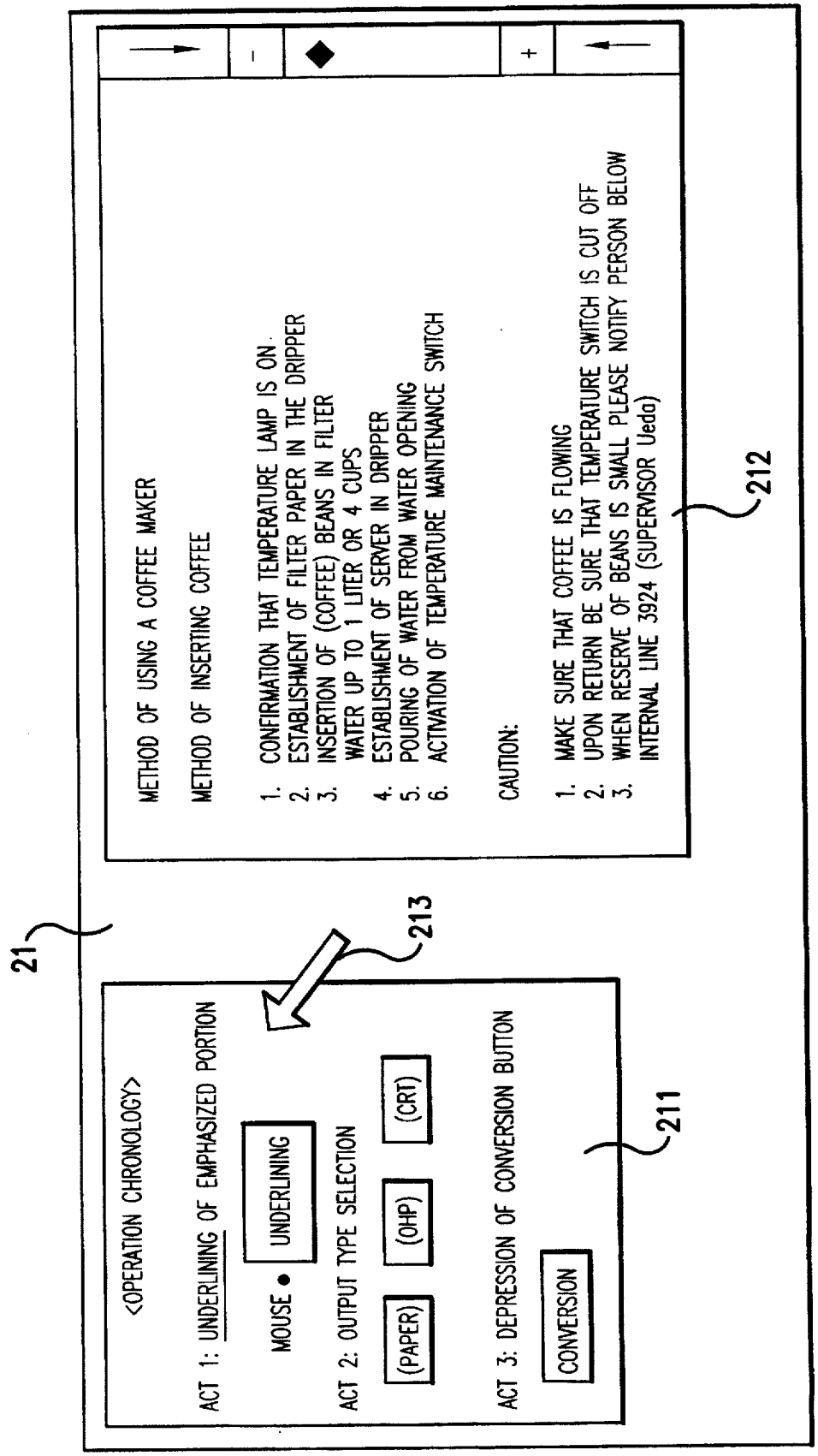

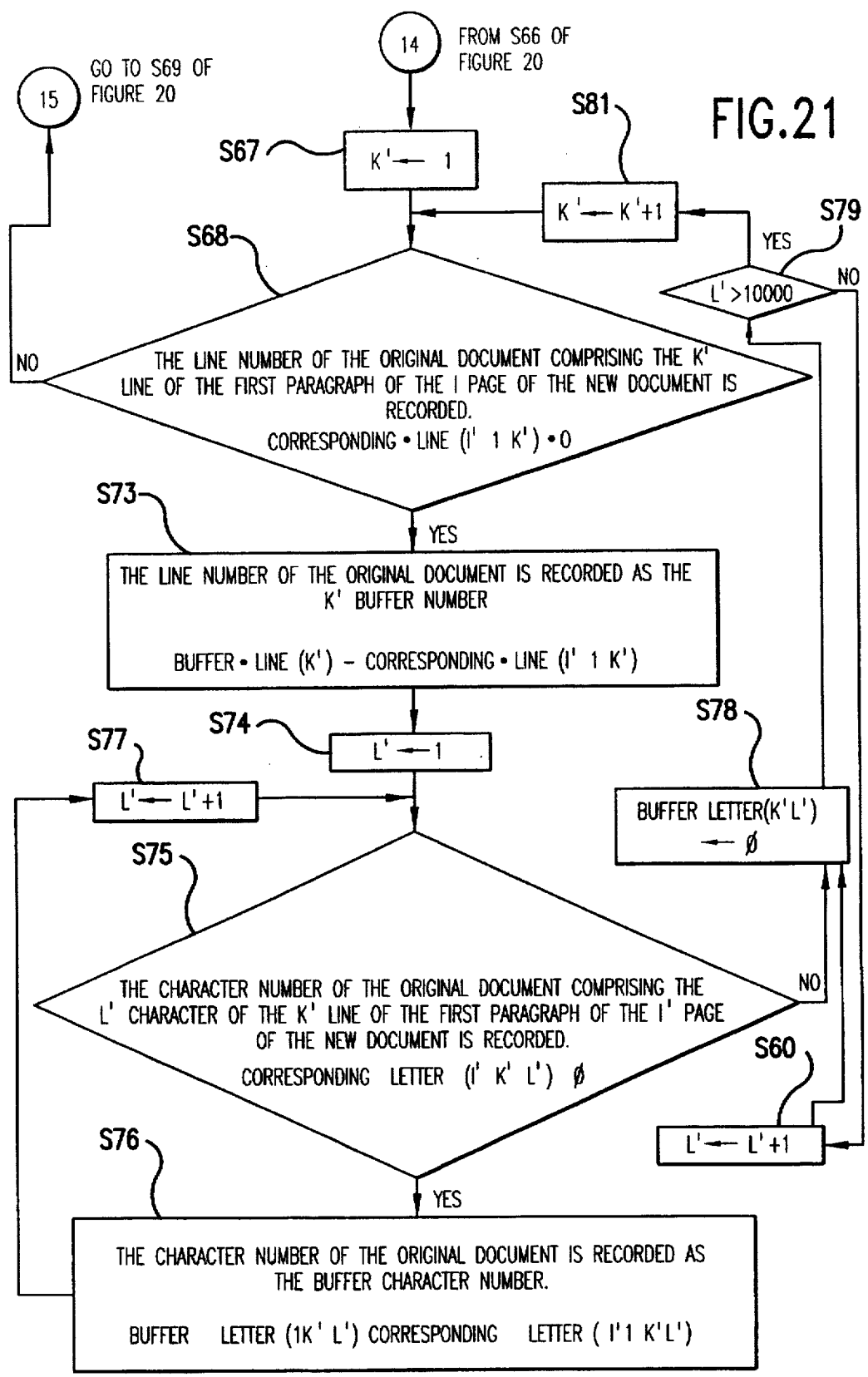

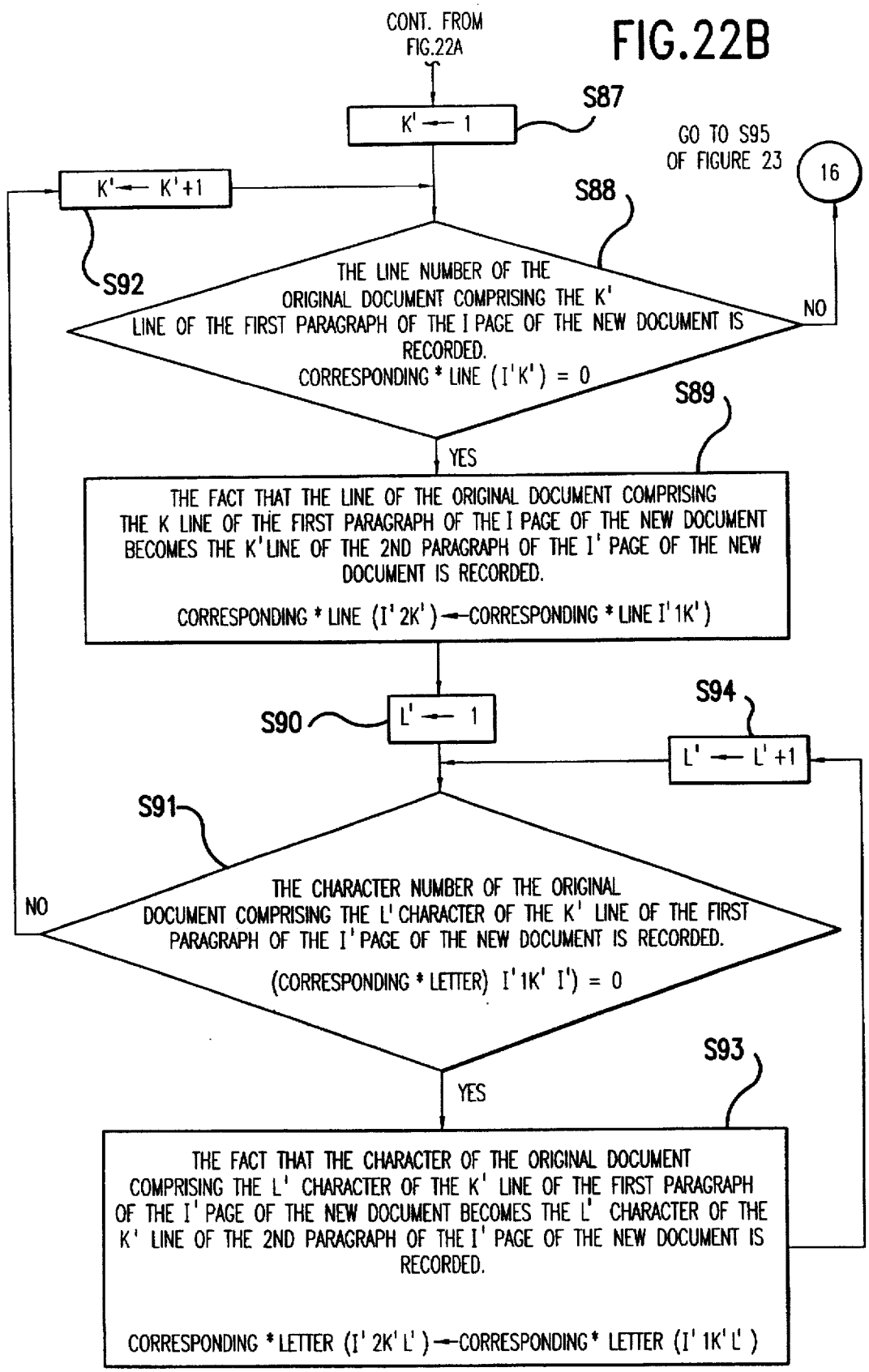

TEXT EDITOR FOR CONVERTING TEXT FORMAT TO CORRESPOND TO AN OUTPUT METHOD

BACKGROUND OF THE INVENTION

1. Field of the Invention

This invention relates to a text editing device that is provided with an automatic selection execution function for selecting the manner of emphasizing places to be emphasized that are included in the text, corresponding to differences in the output format of the text.

2. Description of Related Art

There are various ways of outputting the form of text, either using the form created by the author of the text, or by those who reuse the text making use of data equipment. Such types include providing output on paper, OHP sheets, or from software copies onto a CRT. Even though the substance of the text to be communicated is the same, if the use or the output form of the transmitted message is different, then there are many occasions in which the technological method for expressing the text will need to be changed in accordance with its use and the form of its output. For example, if the output form is to be made on paper, then it would ordinarily be printed in portrait format, but if use is to made of OHP sheets, then it would be printed in landscape format.

As technological support for text editing operations corresponding to the output format, the following types of technologies have been disclosed. For example, Japanese Patent Application 05-342325 discloses the reading of a paper text image, on which the page proportions or the sizes of character images (font) appropriate to OHP sheets are automatically created. In addition, with the technology disclosed in Japanese Patent Application 06-16216, black and white may comprise the text of the source document, in which regard (negative/positive) transmission must be accomplished including the automatic application of color, by which means visually superior OHP sheets and the like are created. Users of a text editing device that is equipped with such technology can provide mechanical input of indications, and can manually handle such text editing as layout corresponding to the output type, as well as the application of color without any manual editing complications.

However, some care must be exercised when making changes to the text layout or to the application of color corresponding to the output type. Mainly, this has to do with the emphasizing effect of emphasized text that is included in the document. For example, text that is on paper is ordinarily read at a close distance by the reader, at his own pace. Furthermore, in order to establish individual terms at one's discretion within the document, such terms can be printed for example in red, or they may want to have another optional stage of emphasis, such as highlighting in yellow. Furthermore, emphasis may be placed on words within the text without any limitation being placed on the number of words to be emphasized. This method of emphasizing text adds heightened effectiveness to text for which one desires to provide emphasis.

However, when preparing OHP sheets, if such emphasis is left in its existent state, the effective emphasis for the emphasized locations is lost. Text that appears on OHP sheets that is projected onto a screen ordinarily is meant to be read by a large audience. The audience is somewhat distant from the screen, and the person providing the presentation often uses gestures to provide reference to certain locations, which are coordinated to the pace of the provided presentation, as reading progresses through the projected document. Furthermore, when it is desired to place emphasis on some particular word or text, rather than showing the text in red, it is easier for the audience to look at it if a red or blue background is provided, for example, with reverse printing and white characters. This preserves the effect of emphasizing the emphasized sections. Also, more than is the case with paper, discrimination can be provided to heighten the effect of emphasis by increasing the size of words, in order to differentiate them from text for which there is no need for emphasis, by changing the "jump" ratio of the characters composing the words. Furthermore, if there are too many locations in one OHP sheet, then the points of discourse in the presentation can become lost. Since there will be insufficient time for anyone to read the text at the pace of the reader, it becomes difficult to understand the presentation. Furthermore, when changing the layout, a need arises to reduce the amount of information on a single page, and this makes it necessary to limit or reduce the number of emphasized locations.

According to the cited prior art technology, there is no provision for providing know-how to the creator of the text in terms of how to create desired emphasis. In addition, there is also no way for the know-how to be provided as support to the creator of the text so that the user could be provided with automatic selection and execution. As a consequence, text is flooding the office place without the benefit of the effect of emphasis, resulting in a deterioration of communication.

SUMMARY OF THE INVENTION

The present invention, provides a function in which automatic selection and execution can be accomplished of an output type of text for which there is a desire to place emphasis in particular locations, without the need for the user to receive any detailed instruction. In addition, it is an object of the present invention to divide the pages of text on the basis of the composition of the characters, by simply indicating the OHP output type, without any particular skill on the part of the user.

In order to resolve the problems referred to above, the text editing device according to the present invention comprising a text data holding means that holds the text data of the text to be edited; a conversion rule holding means that holds multiple conversion rules that differ in terms of the emphasis to be placed on emphasized locations corresponding to the output type of the text; a user input indication means that accomplishes the input of the user's desires relating to emphasis indications and indications of output type; and a text data conversion means wherein selection is made of the conversion rules corresponding to the multiple conversion rules that are held within the conversion rule holding means, in order to follow the emphasis indications and the output type indications that have been input into the input indication means by the user, rewriting the text data on the basis of the selected conversion rules.

BRIEF DESCRIPTION OF THE DRAWINGS

FIG. 2 is a diagram which shows an example of a user interface in an embodiment of the present invention.

FIG. 21 is a flow chart which shows an example of the conversion rule (phase 3 continuation) when the output form is "OHP" in an embodiment of the present invention.

DETAILED DESCRIPTION OF PREFERRED EMBODIMENTS

An explanation of an actual embodiment of the present invention is provided hereafter, with reference to the drawings. First an explanation will be provided with respect to the composition of the embodiment.

Figure 1:
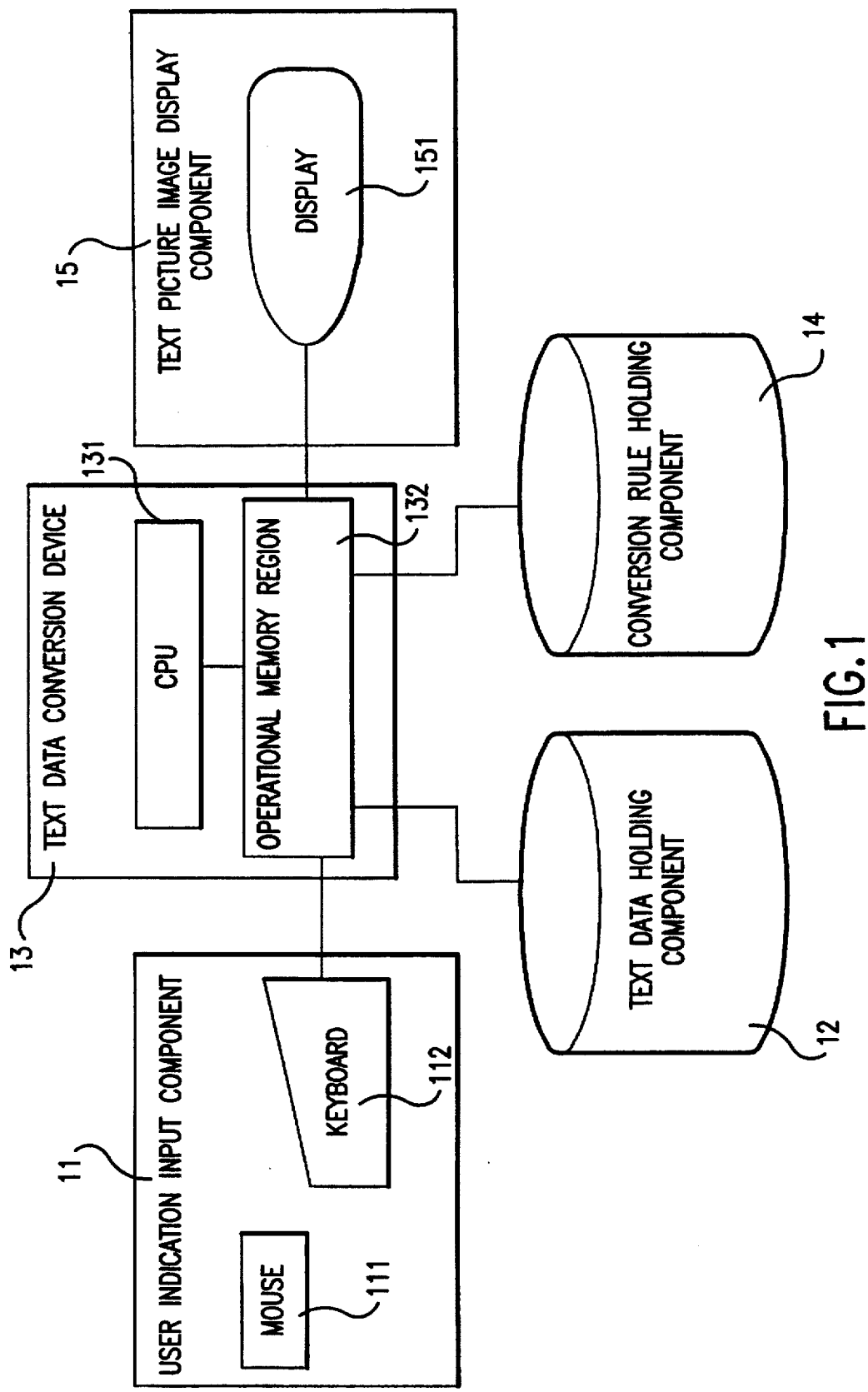
FIG. 1 is a construction diagram of an embodiment of the present invention.

FIG. 1 is a block diagram showing the basic composition of an embodiment in which appropriate application of the present invention is made on a word processor. The device described in the present embodiment, as shown in the block diagram of FIG. 1, is composed of a user input indication component 11 that accomplishes the input of the user's desires relative to indications of emphasis and output type; a text data holding component 12 that holds the text data of the text that is the object of editing; a text data conversion component 13 that calls out the appropriate conversion rules in accordance with the indications input by user input indication component 11, and which accomplishes rewriting of the text; a conversion rule holding component 14 that holds the conversion rules; and a text picture image display component 15 that provides the user with a picture image of the text. The user input indication component 11 is provided with a mouse 111, as well as a keyboard 112; and the text data conversion component 13 is provided with a CPU 131 in order to execute the conversion function, as well as an operating memory 132, and the text picture image display component 15 includes a display 151.

FIG. 2 is a scaled drawing of a user interface that is provided in order to facilitate dialog between the user and the text editing device according to the present embodiment. In FIG. 2 are included the user input indication component 211 and the text picture image display component 15 that have already been explained in FIG. 1. In the scaled diagram of FIG. 2, number 21 represents the CRT display; number 211 represents a virtual keyboard that is displayed on the CRT display; number 212 represents a window that is used to show the text picture image being displayed on the CRT display; number 213 is a mouse cursor that is displayed on the CRT display. The virtual keyboard 211 is part of keyboard 112 that composes the user input indication component 11 shown in FIG. 1. Messages that chronologically explain the operations to the user, such as "selection of Act 2 output type", and the input button that accomplishes the indicated input of the user such as "OHP", are both displayed. As the user reads the messages, he proceeds by accomplishing the indicated input. The user moves the mouse cursor 213 that is indicated on the CRT display of FIG. 2 by operating the mouse 111 that composes the user input indication component 11 shown in FIG. 1 and is able to depress the input button of the virtual keyboard 212. The window 211 that is used to display the text picture image is a component of the display 151 that composes the picture image display component 15 shown in FIG. 1. This provides a visual display to the user of the picture image of the text that is the object of editing. Since this window comprises a user interface of the direct operation type, the user moves the mouse cursor to 213, which is displayed on the CRT display of FIG. 2, by means of operating the mouse 111 shown in FIG. 1. Optional selection can then be made of displayed text picture images. These images can then be underlined, or otherwise handled. Scrolling of the entire picture image text and other operations can be simply accomplished.

In FIG. 2, both the virtual keyboard 211, and the window 212 used to display the text picture image are displayed on the CRT display. However, in the case of multiple CRT displays, the virtual keyboard 211 and the window 212 can be displayed on separate CRTs, respectively. Of course, the display does not necessarily have to be a CRT. A liquid crystal display or a plasma display can also be used. In addition, in FIG. 2, the input button used for the purpose of providing input indication is manifest as a "soft" button (comprising a component of the virtual keyboard) displayed on the CRT display. However, this can also be an actual hardware button on a control panel separate from the CRT display. Furthermore, in FIG. 2, the mouse cursor is the means for depressing the input button. However, other input devices such as touch panels can be used.

Figure 3A:
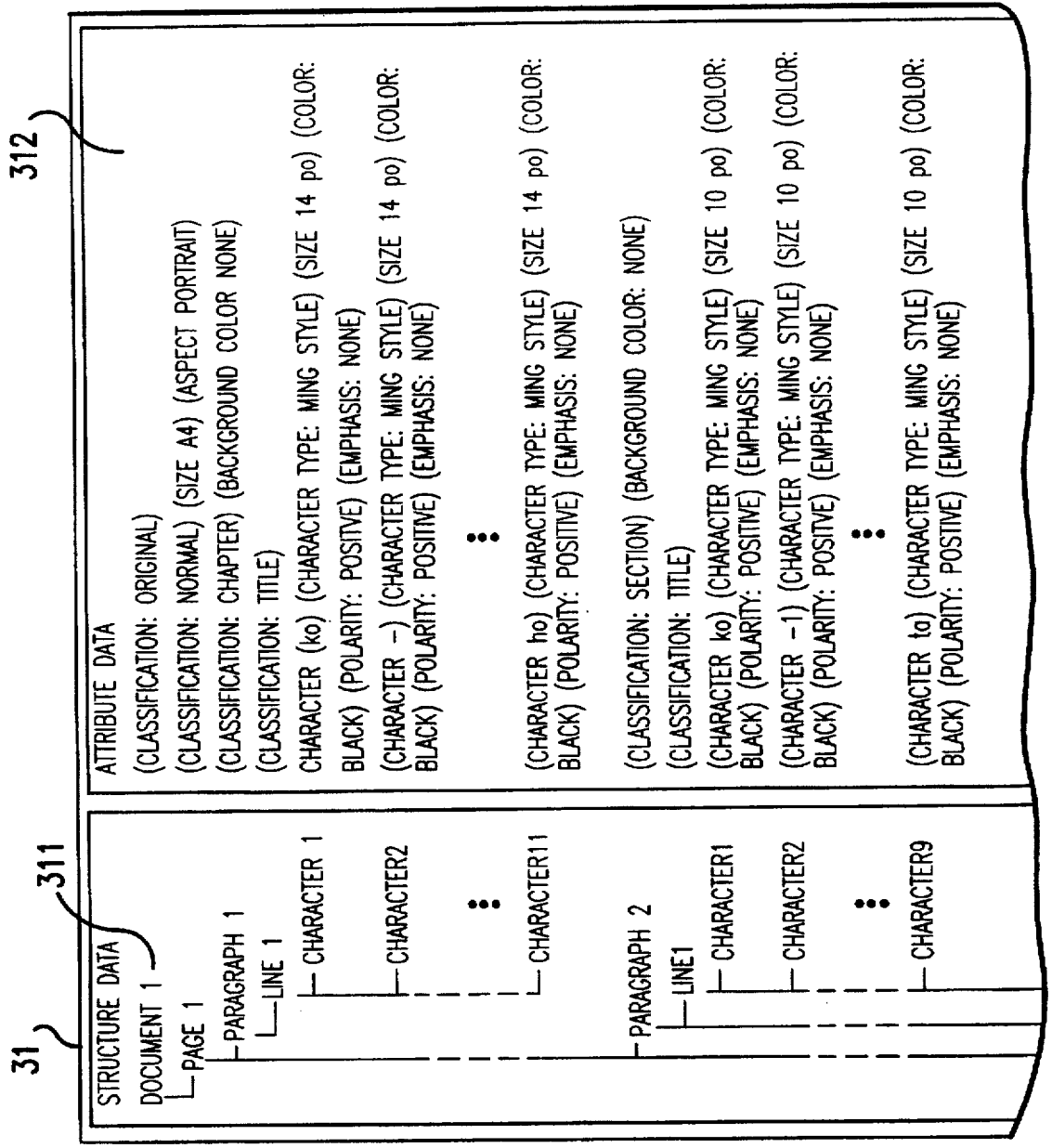
FIG. 3 is a diagram which shows an example of text data in an embodiment of the present invention.
Figure 3B:
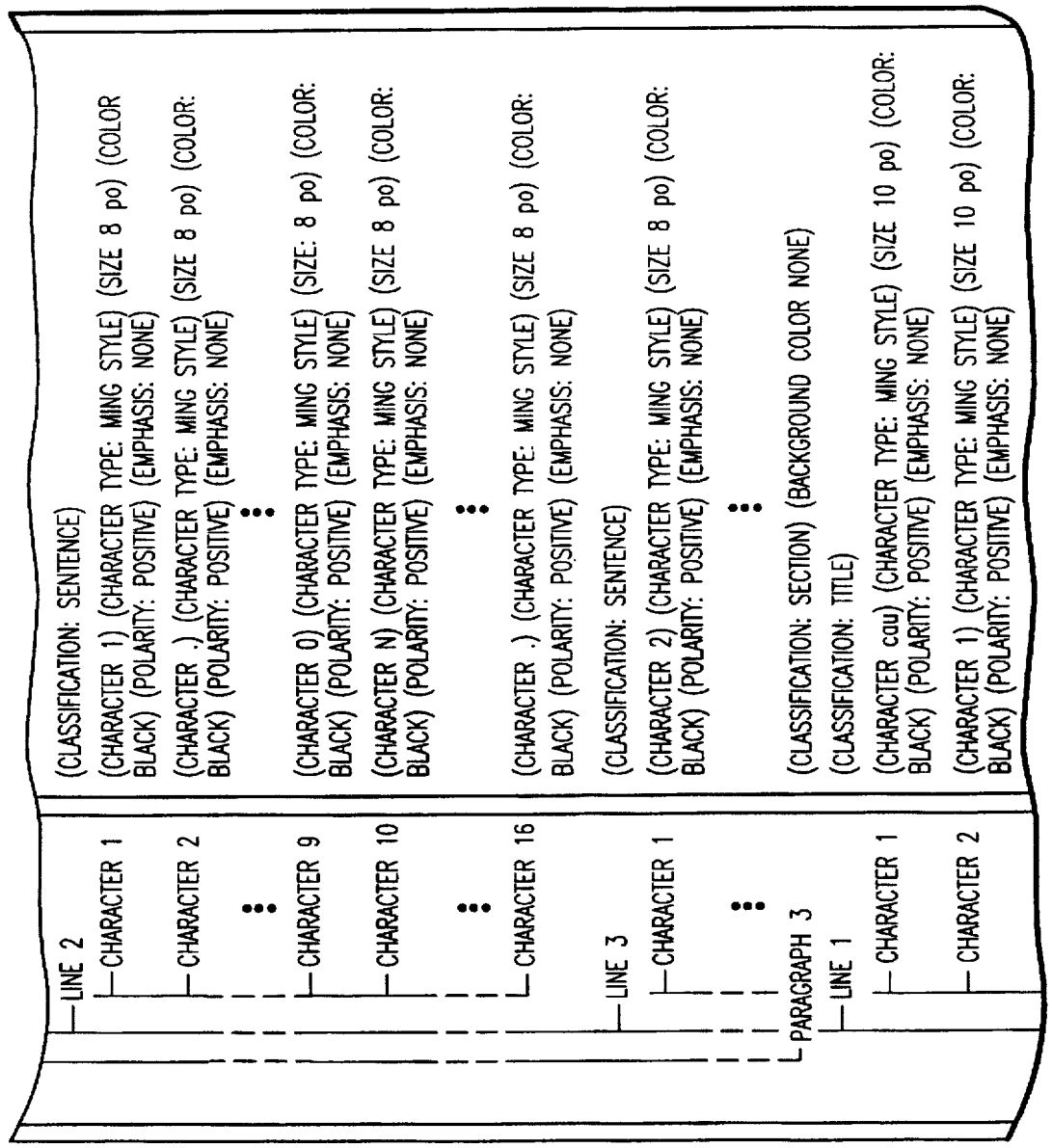
Figure 3C:
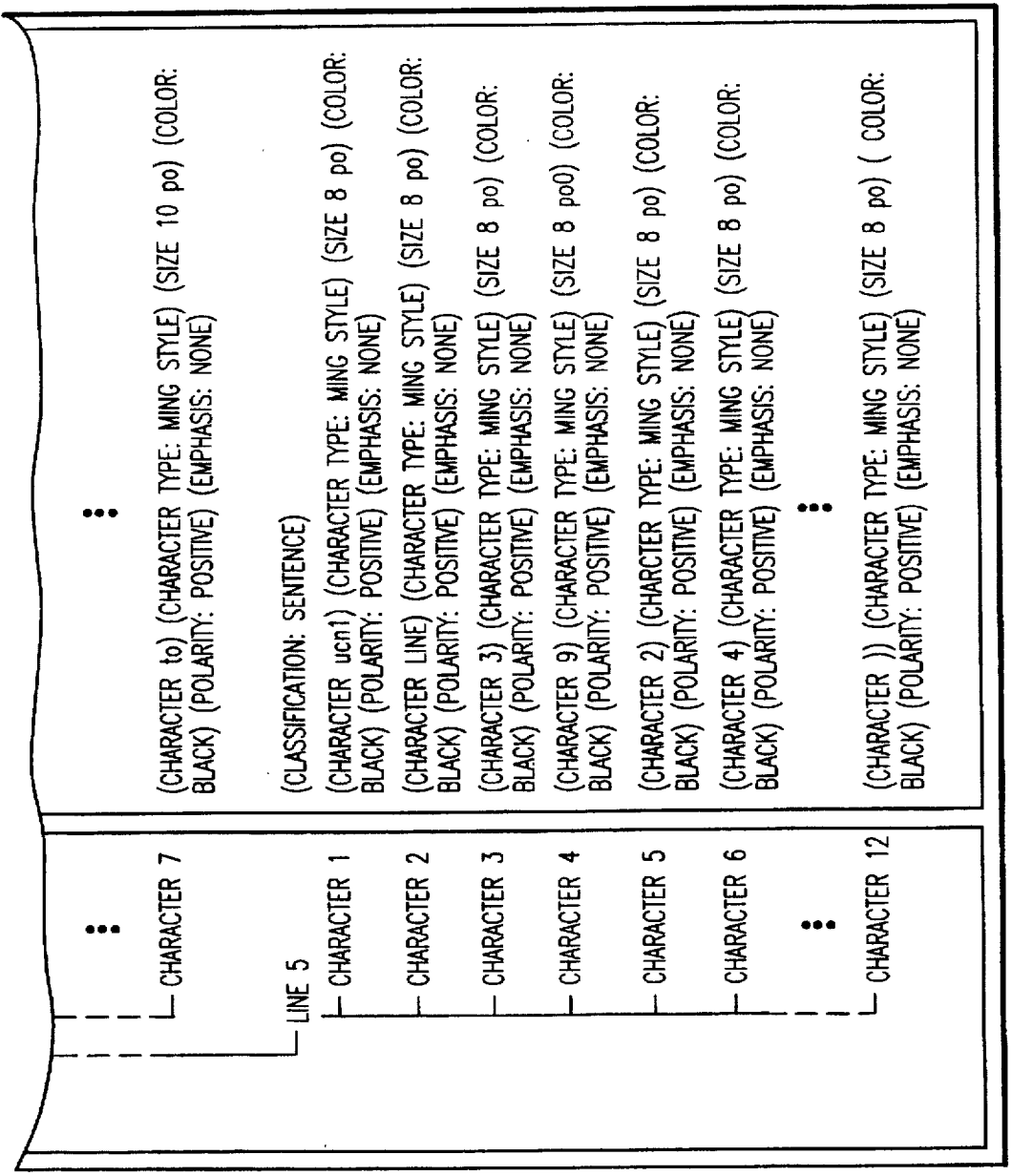

FIG. 3 comprises a component of the text data held in the text data holding component 12. In FIG. 2, this corresponds to the visual text picture image 212. The text data 31 is formed from the structural data 311, and the attribute data 312.

The structure data shown in 311 of FIG. 3 is manifest by the hierarchical structure diagram showing the structure of various text. The text as well as the text compositional elements are manifest in a symbolic node such as "text", "page", "paragraph", "line", and "character." By linking them, vertical relationships in the text can be used for example to manifest hierarchical structure. In 311 of FIG. 3, the text is composed on one page (for example the node of "document 1" can be constructed in the lower position of the node "page 1.") Also, three paragraphs can be composed on one page (for example the node "page 1" is a parent of the node "paragraph 1", the node "paragraph 2", and the node "paragraph 3"). The first paragraph of one page consists of a single line (for example the node "paragraph 1" is the parent of the node "line 1.") The composition of eleven characters forms a single line of the first paragraph of a page (for example the node "line 1", which is one of the children of the node "paragraph 1", is the parent of the node "character 1", the node "character 2", and the node "character 11.")

The attribute data shown in 312 of FIG. 3 are manifest as a list showing the attribute values and the attributes of individual compositional elements composing the structure data. For example, the attribute values and the attributes of the first character of the first line of the first paragraph of the first page of "document 1" is manifest as a list shown as character: ko, character type: Ming style, size: 14 po, color: black, polarity: positive and emphasis: none. In this instance, the character is represented by the Japanese katakana character "ko", the character type is represented by "Ming style type", the size is "14 points", the color of the print is "black", the polarity is "positive", and there is no emphasis provided.

The visual text picture images 212 explained in FIG. 2, are written in accordance with FIG. 3 that shows structure data 311 and attribute data 312. The structure data and attribute data, that has been changed by means of the conversion rules, are visually re-displayed after they have been rewritten as the text picture images 212.

In FIG. 3, structure data is manifest as a hierarchical structure diagram, whereas the attribute data is manifest as a list. However, according to the present invention, the handled text data is not limited. The data can be manifest in accordance with another method, for example, a semantic network, or as a method in which all the data is listed, etc.

The conversion rules that are held within the conversion rule holding component 14, are algorithms that chronologically show the rewriting of the text data, mainly, the structure data of the text that comprises the object of editing and attribute data, as shown in FIG. 3. FIGS. 12–16 and 17–31, explained hereafter, are flowcharts that describe the conversion rules.

The conversion rules are classified and stored so that they can be appropriately utilized with respect to the output type input indication of the user. If for example the user were to select "paper" as the output type, then application would be made of "the conversion rule for when 'paper' is the output type" (FIGS. 12–16). When the user selects "OHP" as the output type, then application is made of the "conversion rule for 'OHP' as the output type" (FIGS. 17–31). When the user selects "CRT" as the output type, then application is made of the "conversion rule for 'CRT' as the output type" by which selection the information can be held for later access and use.

Next, an explanation will be provided with respect to the operation of a current embodiment.

Figure 4:
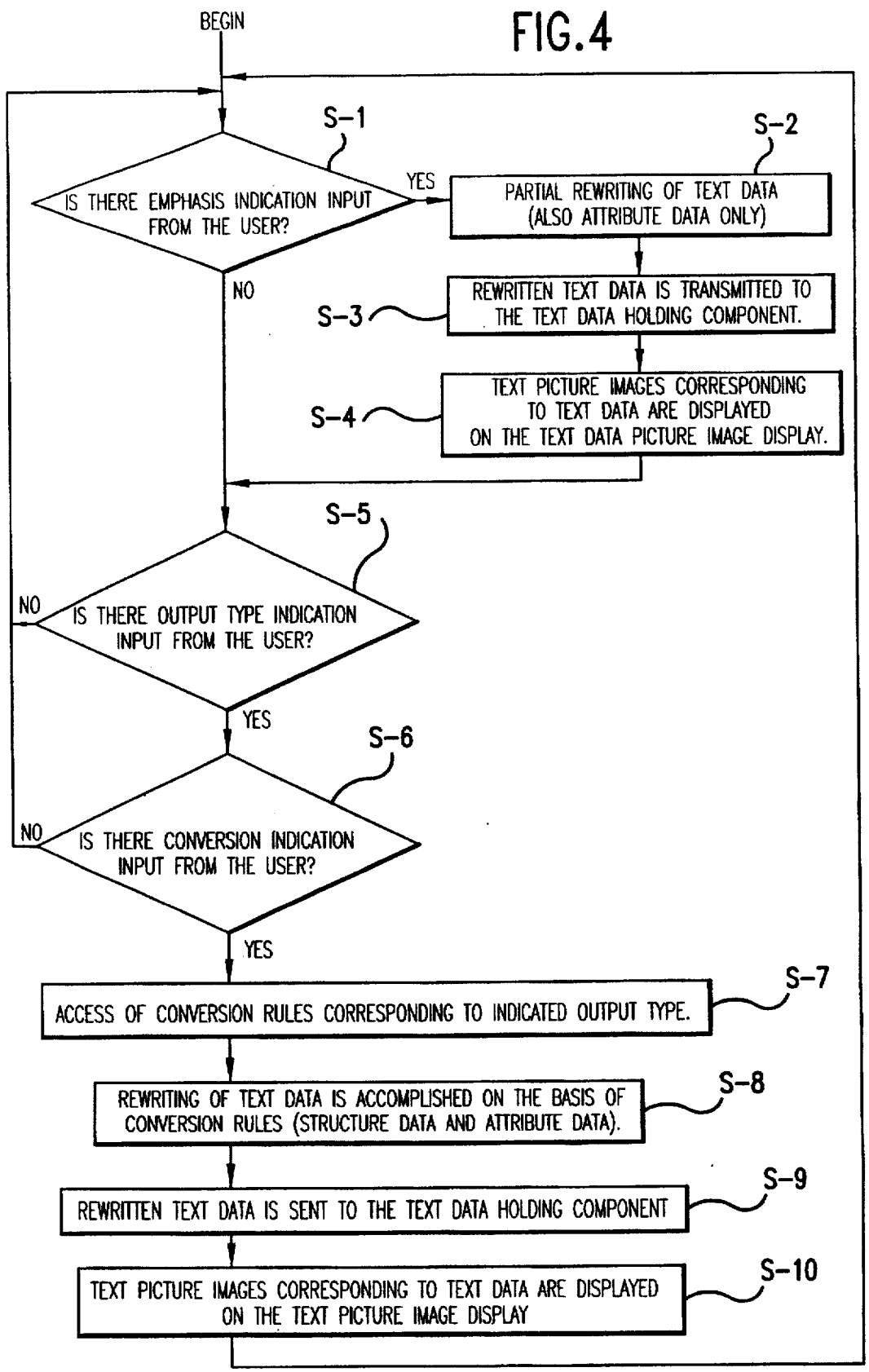
FIG. 4 is a flow chart which shows the handling in an embodiment of the present invention.

FIG. 4 is a flowchart that explains the operation of the embodiment shown in FIG. 1.

Through the user input indication component 11, the user can indicate those sections of the text that should be edited for which he would like to provide some emphasis within the text (S-1). If input has been provided by the user to indicate the emphasis, then partial rewriting is accomplished of the text data that is held within the text data holding component 12. This is accomplished in the text data conversion component 13 (S-2). The rewritten text data is then held for an indeterminant amount of time in the text data holding component 12 (S-3). Also, text picture images corresponding to the text data that has been rewritten are visually provided to the user through the text picture image display component 15 (S-4). In this instance, in rewriting portions of the text data, the rewritten portions of the attribute data and structure data are not included.

Next, the user can indicate (S-5) the final output form of the text to be edited, for example, whether it is paper, OHP sheets, or a soft copy provided on the CRT, etc. Finally, commands are issued (S-6) for conversion to be accomplished in combination with the final output form for such things as the layout of the text to be edited, or the application of color. If input has been provided by the user with respect to the output type and the conversion input, then the conversion rules are accessed (S-7) corresponding to the output type from among the conversion rules that are held within the conversion rule holding component 14. On the basis of these rules, the text data of the text held in the text holding component 12 is rewritten. However, the text data that is rewritten, as accomplished (S-8) in the text data conversion component 13 is held (in step S-9) in the text data holding component 12. Furthermore, the text picture images corresponding to the text data of the text that has been rewritten are visually provided to the user (S-10) through the text picture image display 15. In this instance, rewriting of the text data, in principle, includes structure data, but does not include attribute data.

However, there is no limit to rewriting of either the structure data or the attribute data. In this instance, when the applied rule is "the conversion rule for the output type is 'paper'" (FIGS. 12–16) then attribute data is rewritten. When the applied rule is "conversion rule for output type 'OHP' (FIGS. 12–13, and FIGS. 17–28)) then both structure data and attribute data are rewritten. The rewritten contents differ depending upon the type of rule applied.

Furthermore, according to the flowchart shown in FIG. 4, until the conversion input indication (S-6) is accomplished by the user, no conversion is accomplished of the text data or of any conversion rule. However, the step (S-6) is abbreviated, and if an output type input indication (S-5) has been applied by the user, then data can be rewritten in accordance with a conversion rule.

Next, an explanation is provided of the detailed operations of the present embodiment.

With a user interface as shown in FIGS. 1 and 2, the user, while referring to the text picture image 212 that forms the text to be edited, uses the mouse cursor 213 and the virtual keyboard 211, indicating those sections within the text for which emphasis is desired.

Figure 5:
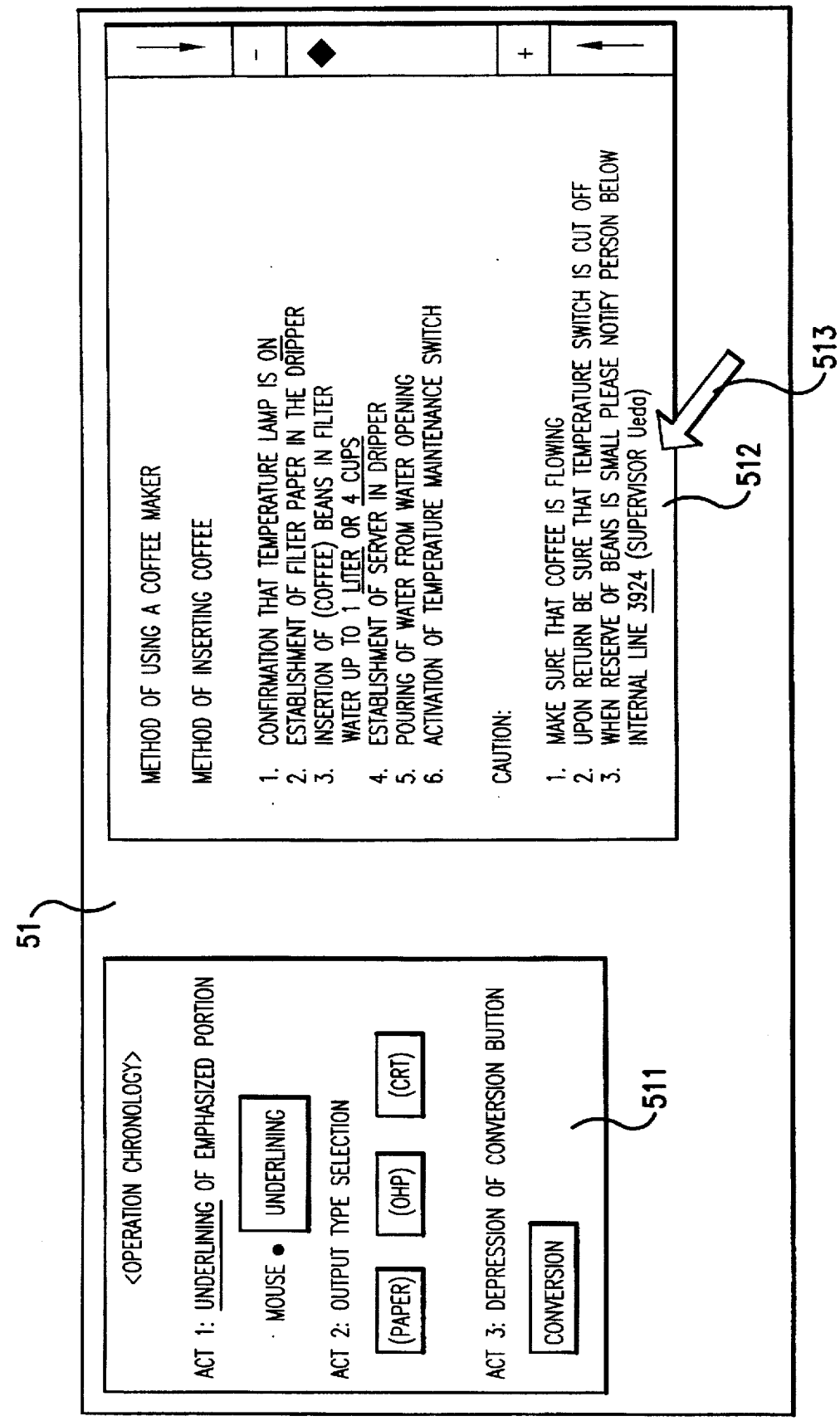
FIG. 5 is a diagram which shows an example of a user interface in an embodiment of the present invention.

FIG. 5, as was the case with FIG. 2 is a scaled drawing of the user interface used to facilitate a dialog between the user and the present invention. The user proceeds by indicating which sections he desires to emphasize. In FIG. 5, the user, while referring to explanatory messages displayed on the virtual keyboard 511, for example, "Act 1 is emphasized by underlining," operates a mouse and a mouse button. By moving the mouse cursor 513, the user can select the characters, lines or paragraphs that are to be emphasized within the text picture image 512. The user next depresses an input button that indicates "underlining" on the virtual keyboard 511, again through the use of a mouse. Once accomplished, the text data that is shown in FIG. 3 as the original data, is then subjected to partial rewriting.

Figure 6A:
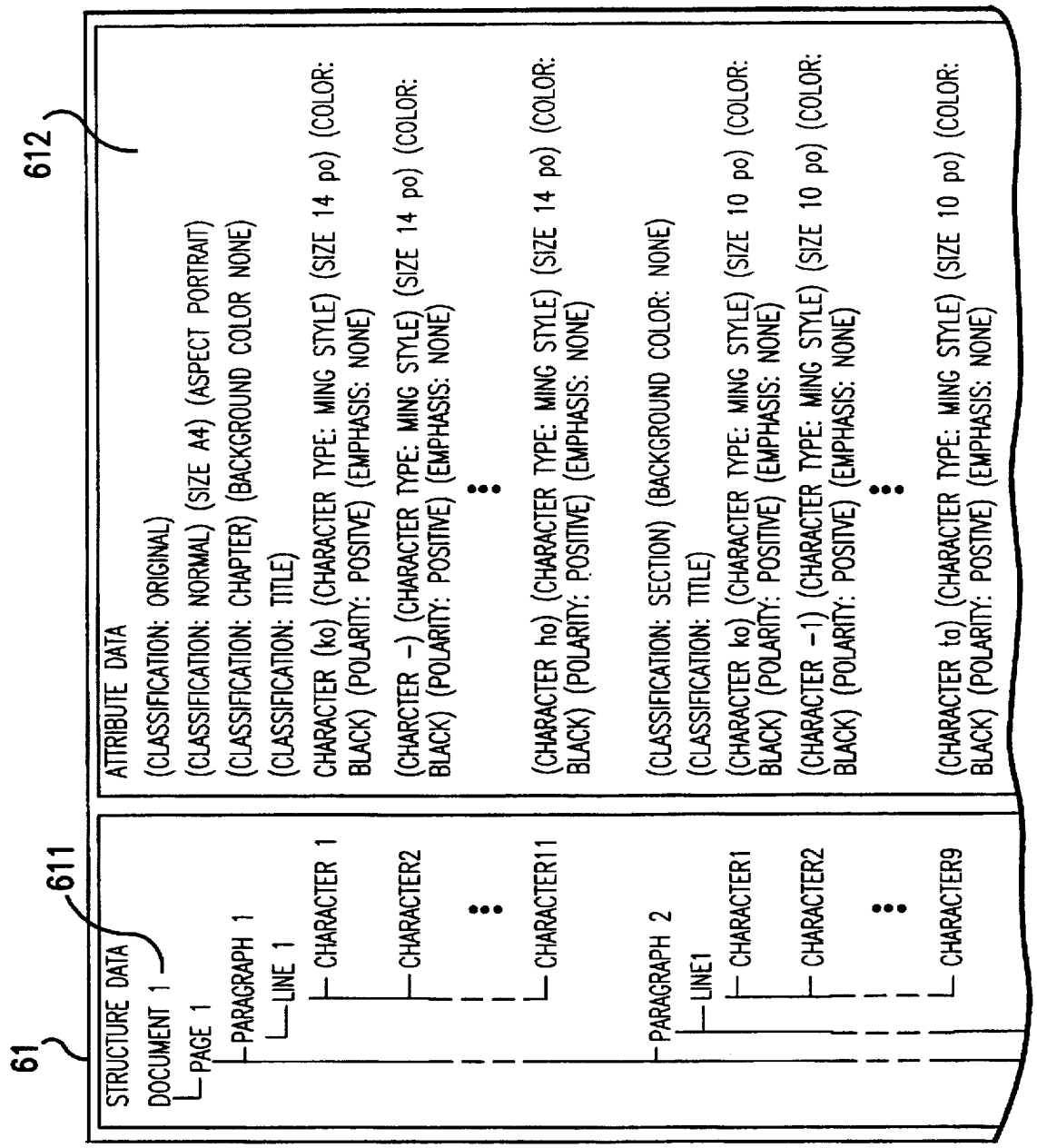
FIG. 6 is a diagram which shows text data in an embodiment of the present invention.
Figure 6B:
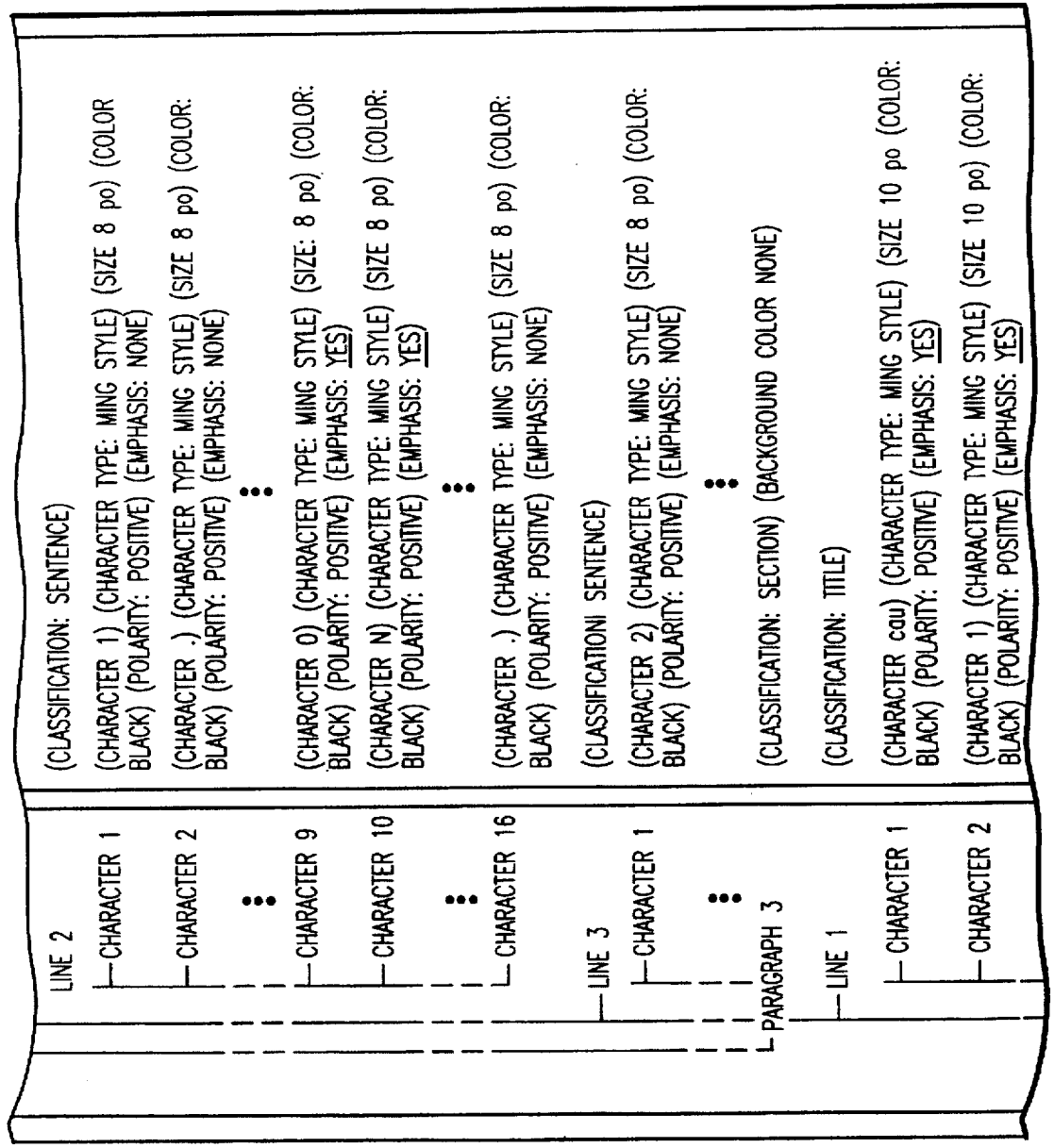
Figure 6C:
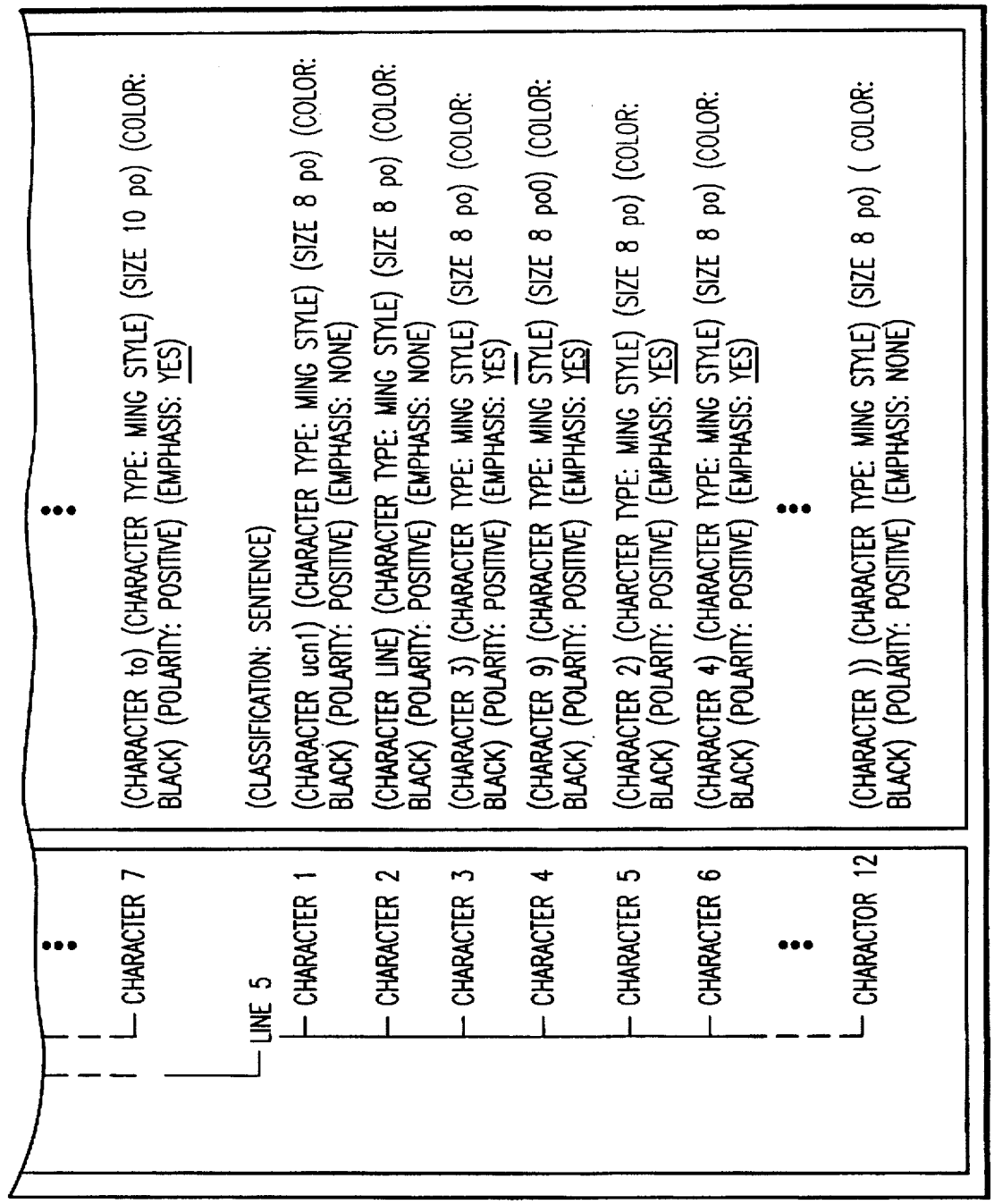

FIG. 6 is a portion of the text data that is partially rewritten, in accordance with the input provided to indicate the provided emphasis. In FIG. 6, the items that are rewritten are underlined (which differs from the original data shown in FIG. 3). The text elements that compose the selected sections to be emphasized as indicated by the user. For example, the attributes relating to the emphasis of "character 9" (O) and "character 10" (N) that compose the second line of the second paragraph, are changed from the emphasis: none shown in FIG. 3 to the emphasis: yes shown in FIG. 6.

The user, can repeat this type of emphasis input indication by means of a mouse, as desired. In other words, there is no limit to the number of sections that can be emphasized. Also, partial rewriting of the text data accomplished on the basis of the emphasis input indication is reflected by the text picture image corresponding to the text data. The text picture image corresponding to the text data of FIG. 6 is a visual image such as is shown in 513 of FIG. 5. Where the user has made a determination to apply double underlining, while referring to sections for which it has been indicated that emphasis is desirable, an emphasis input indication can once again be accomplished.

While referring to the text picture image 512, which comprises the text to be edited, the user, through a user interface such as shown in FIG. 5 can also make utilization of the virtual keyboard 510 and the mouse cursor 513, in accomplishing the output type input indication, and conversion input indication.

Figure 7:
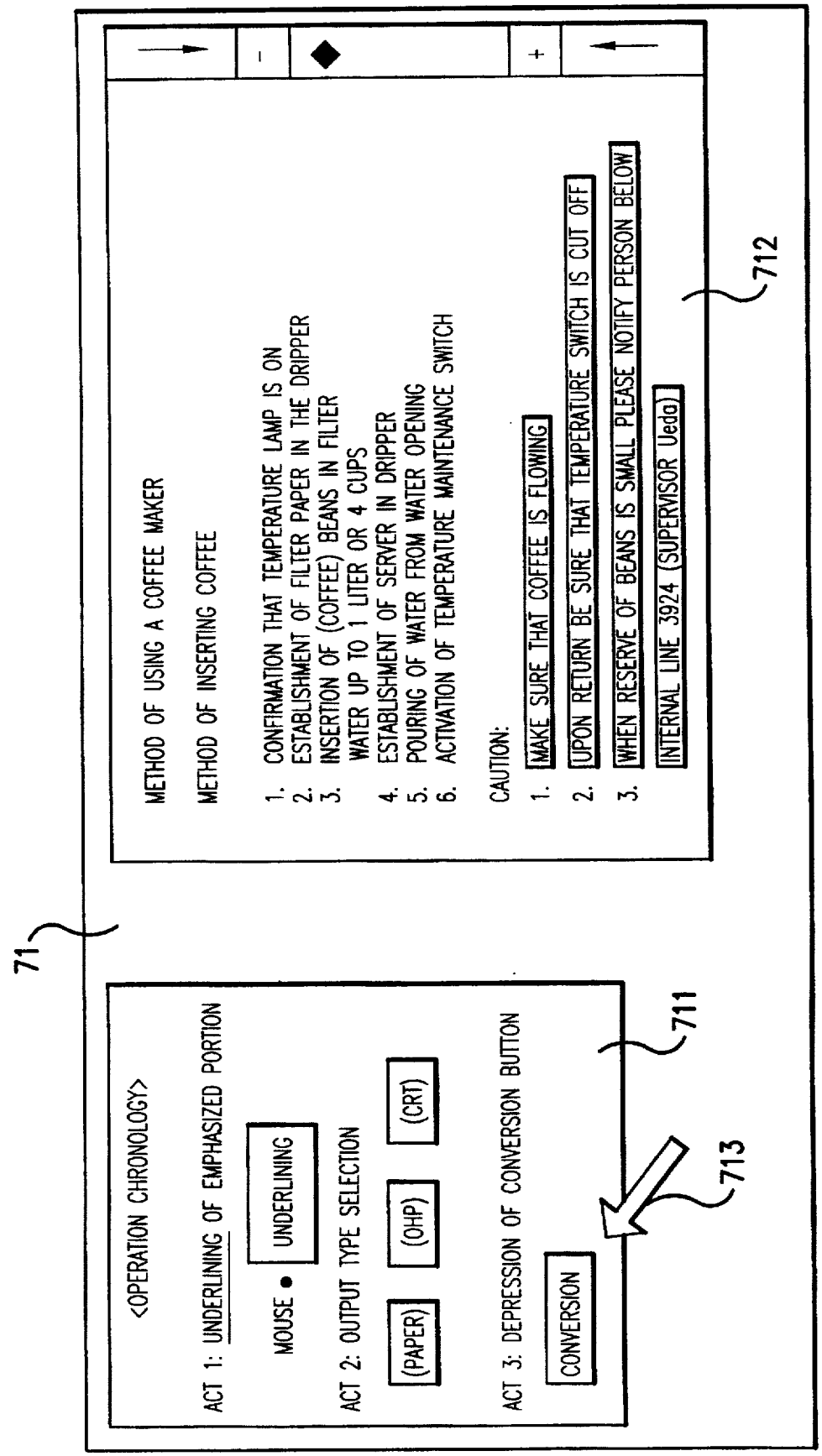
FIG. 7 is a diagram which shows an example of a user interface in an embodiment of the present invention.

FIG. 7, as is the case in FIG. 5, is a scaled diagram of a user interface used for the purpose of accomplishing dialog between the device of the present embodiment and the user. FIG. 7 shows the process followed in the accomplishment of output type input indication and conversion type input indication by the user. In FIG. 7, while the user refers to messages displayed on the virtual keyboard 711, such as "Act 2 selection of output type" or "Act 3 depression of conversion button", the mouse and mouse button are operated. After moving the mouse cursor 713, the input button (in this instance, "paper") of the desired output type is depressed, following which the execution command button to attach the "conversion" label is depressed. Once accomplished, application is made of the "conversion rule for output type 'paper'" (FIGS. 12–16) is accessed, and the original data comprising the text data shown in FIG. 6 is rewritten.

The application of the "conversion rule for the output type 'paper'", is composed of the "chronological rewriting of the text element attributes" of a series such as is shown in FIGS. 12–16. The rewriting chronology is accomplished in three phases. An explanation is provided hereafter with respect to each of these phases.

Figure 12:
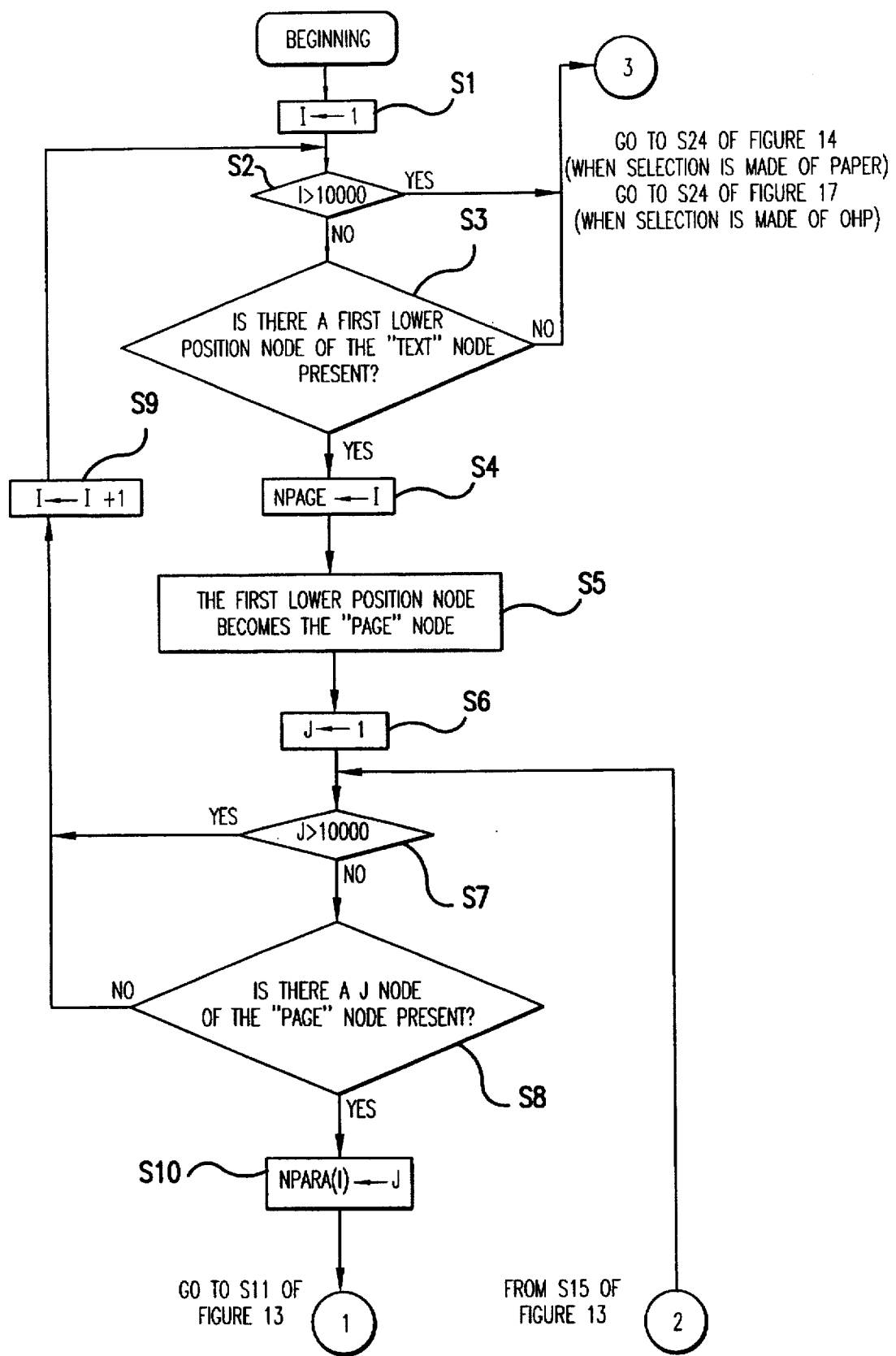
FIG. 12 is a flow chart which shows an example of the conversion rule (in phase 1) when the output form is "paper" in an embodiment of the present invention.
Figure 13:
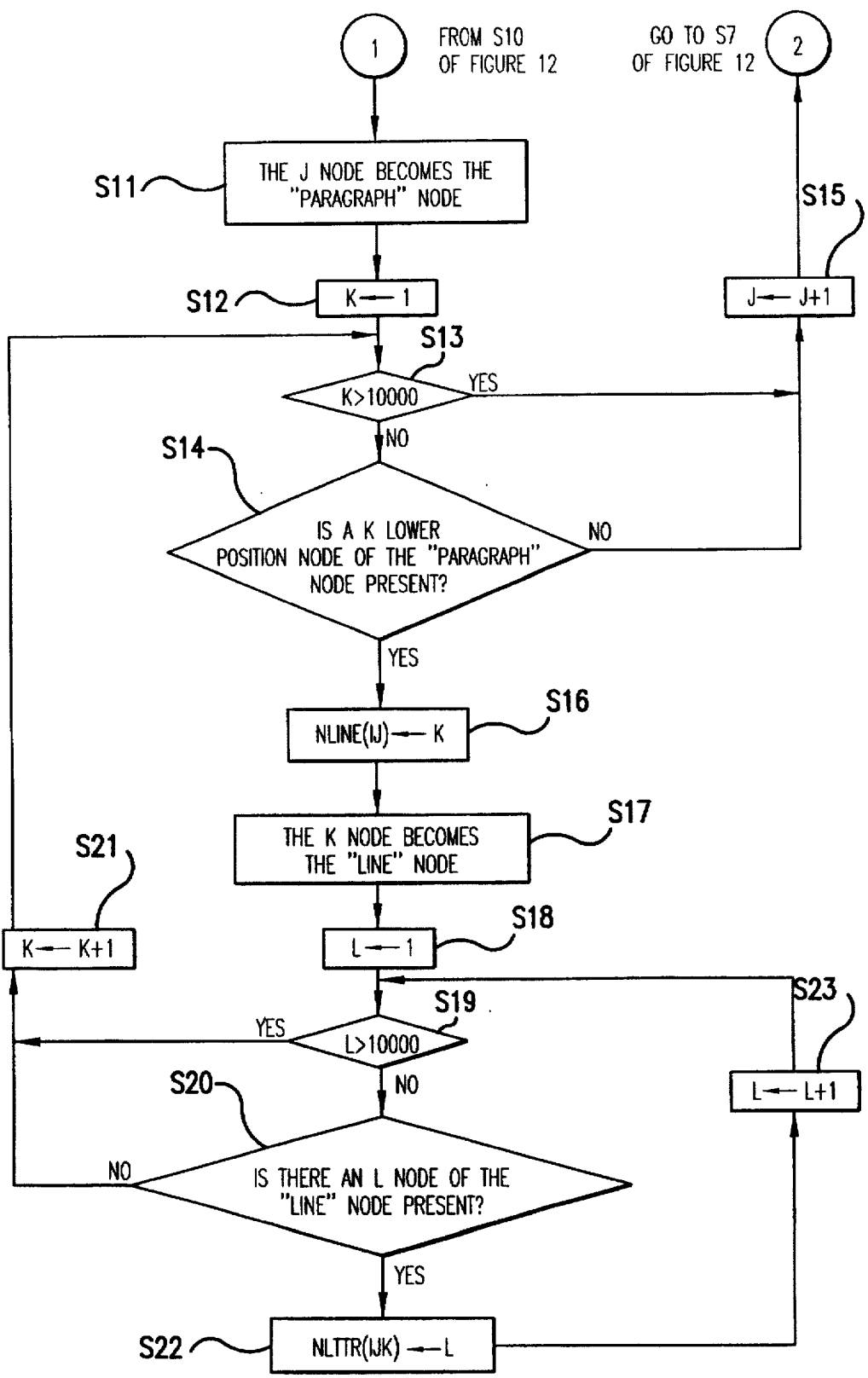
FIG. 13 is a flow chart which shows an example of the conversion rule (phase 1 continuation) when the output form is "paper" in an embodiment of the present invention.

Phase 1 (Steps S1–S23 of FIGS. 12–13)

The structure data of the text comprising the text to be edited, namely the "pag", "paragraph", "line", and "character" numbers are counted by means of following the linkage of the nodes in 611 of FIG. 6. In this phase 1, I represents the parameters that control the chronological number of pages, J represents the parameters that control the chronological number of the paragraphs, K represents the parameters that control the chronological number of the lines, and L represents the parameters that control the chronological number of the characters. For example, a search is accomplished (S3) for the I node of the "character" node (e.g., "character 1"), and if such a node exists, then substitution is made (S4) of the value of I in the NPAGE variable. On the other hand, if no such node is present, then a judgment is made that there is no subsequent page, and no change is made in the value of the NPAGE variable (and progression to S24 of FIG. 14 is eliminated).

The same type of paper work can then be repeated with respect to "paragraph", "line", and "character." As a result of this processing, once phase 1 is completed, then the number of pages NPAGE composing the text, the number of paragraphs NPARA (I) composing the I page, the number of lines NLINE (IJ) composing the J paragraph of the I page, and the number of characters NLTTR (IJK) composing the K line of the J paragraph of the I page can be obtained. These NPAGE and NPARA (I) and NLINE (IJ) and NLTTR (IJK) can be used control parameters in the continuing phases.

Figure 14:
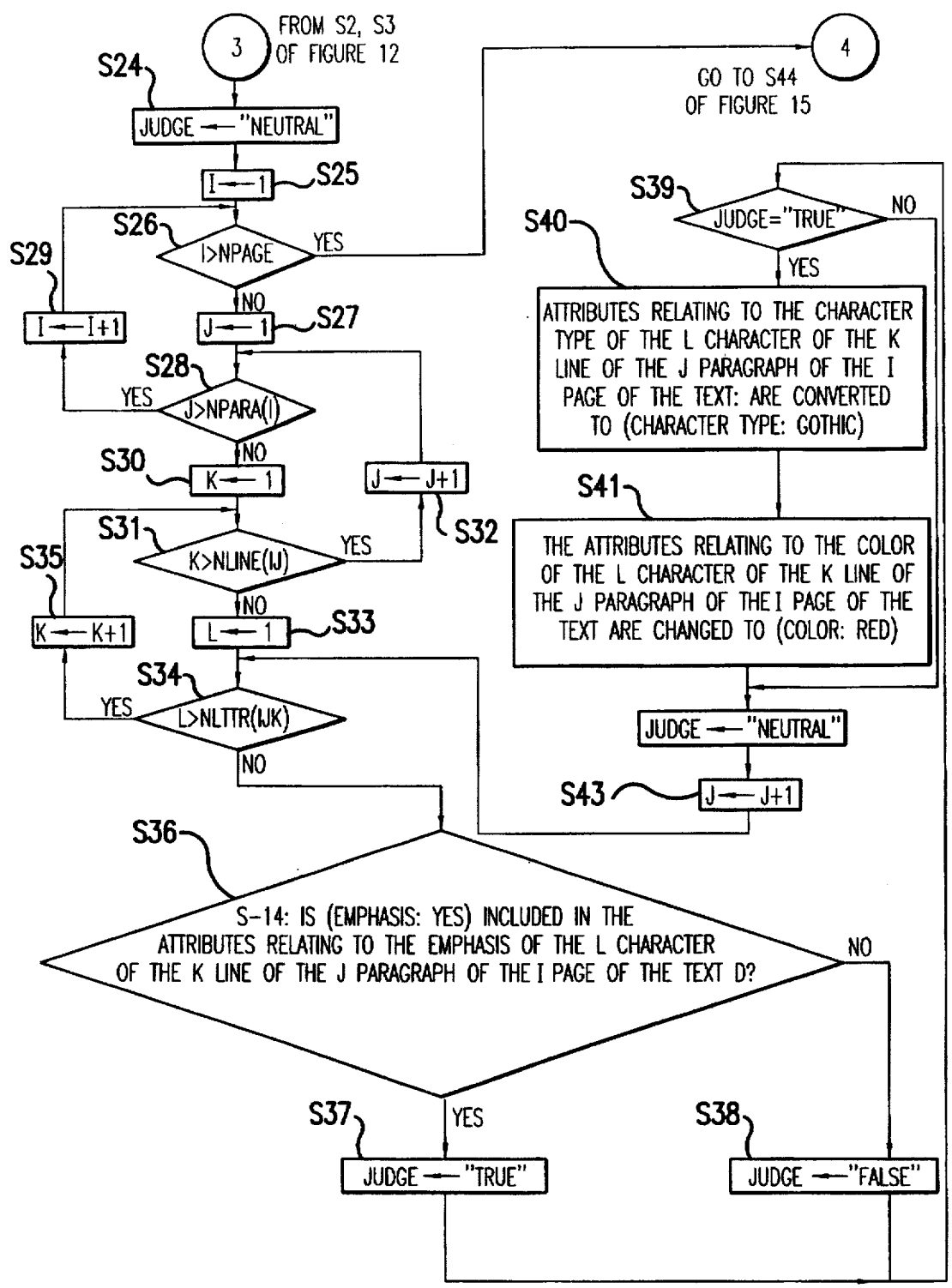
FIG. 14 is a flow chart which shows an example of the conversion rule (phase 2) when the output form is "paper" in an embodiment of the present invention.

Phase 2 (S24–S43 of FIG. 14)

By means of the attribute data of the text comprising the text to be edited, an examination can be made of the attributes of all of the characters composing the text mainly by searching the list 612 of FIG. 6. Characters being limited to those which include emphasis: yes attributes relating to the character type and color being rewritten respectively in terms of character type: gothic and color: red. With phase 2, the control parameters comprising the NPAGE, NPARA (I), NLINE (IJ), and NLTTR (IJK) obtained in phase 1 can be used as judgment parameters, in executing the replacement of the attributes. The judgment can be one of three values comprising "Neutral", (where it is not known whether or not replacement will be accomplished), "True" (where it is accomplished) and "False" (where replacement is not accomplished). First, an examination is made of the attributes relating to the emphasis of individual characters (in step S36), and where emphasis: yes is included, then the value of a judgment is "True", (S37), and where emphasis: yes is not included, then the value of the judgment is "False" (S38). Also, if the value of the judgment is "True", then the attributes relating to the character type of the character is changed to character type: gothic (S40), and furthermore, the attribute relating to color is changed to color: red (in step S41). If the value of the judgment is not "TRUE", then the program moves onto the next character (excluding progression to S42, and S43). Following this chronology and accomplishing execution for each of the characters composing the text, the program moves to phase 3 (excluding progression to S44 in FIG. 15).

Figure 15:
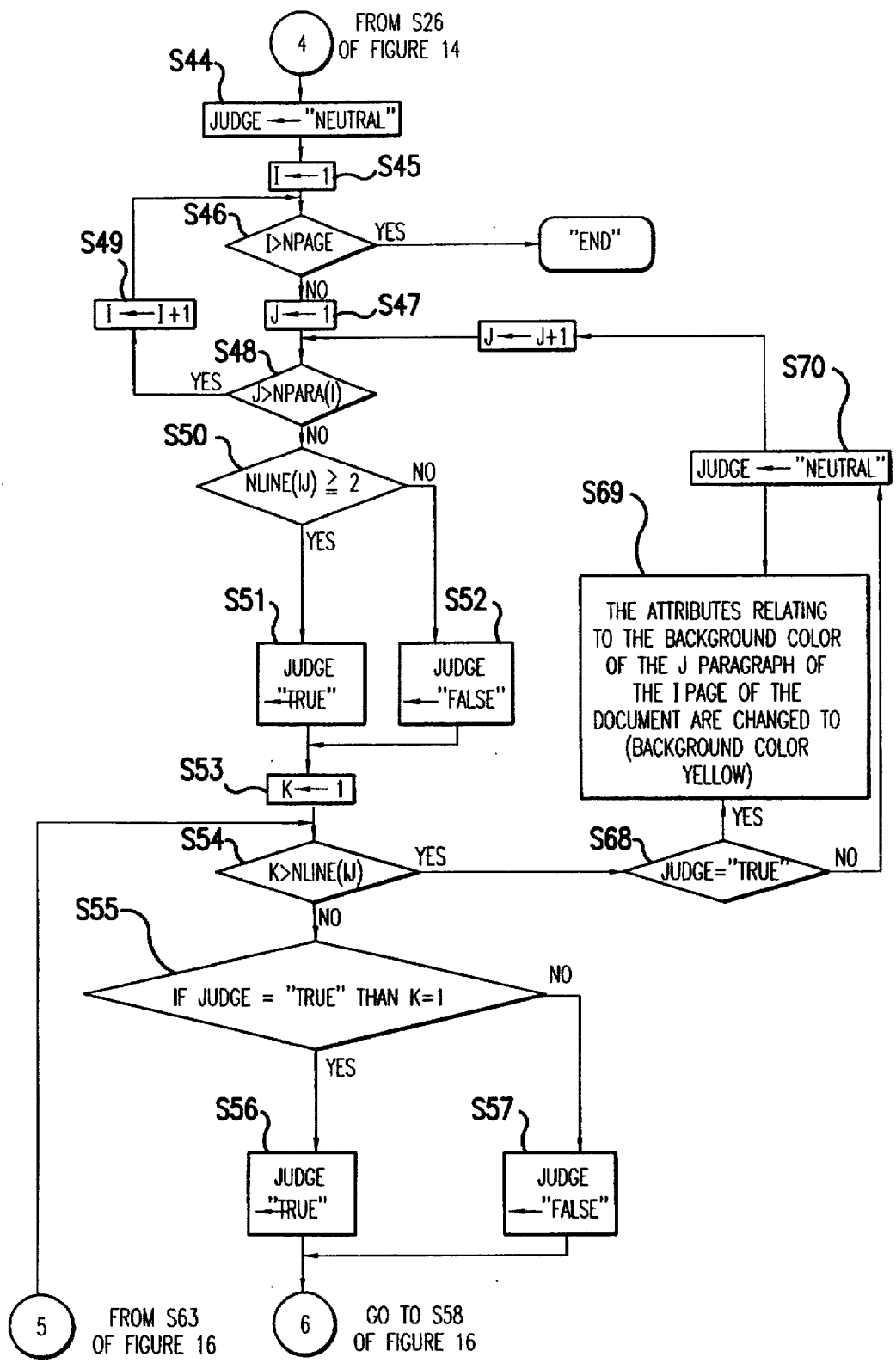
FIG. 15 is a flow chart which shows an example of the conversion rule (phase 3) when the output form is "paper" in an embodiment of the present invention.
Figure 16:
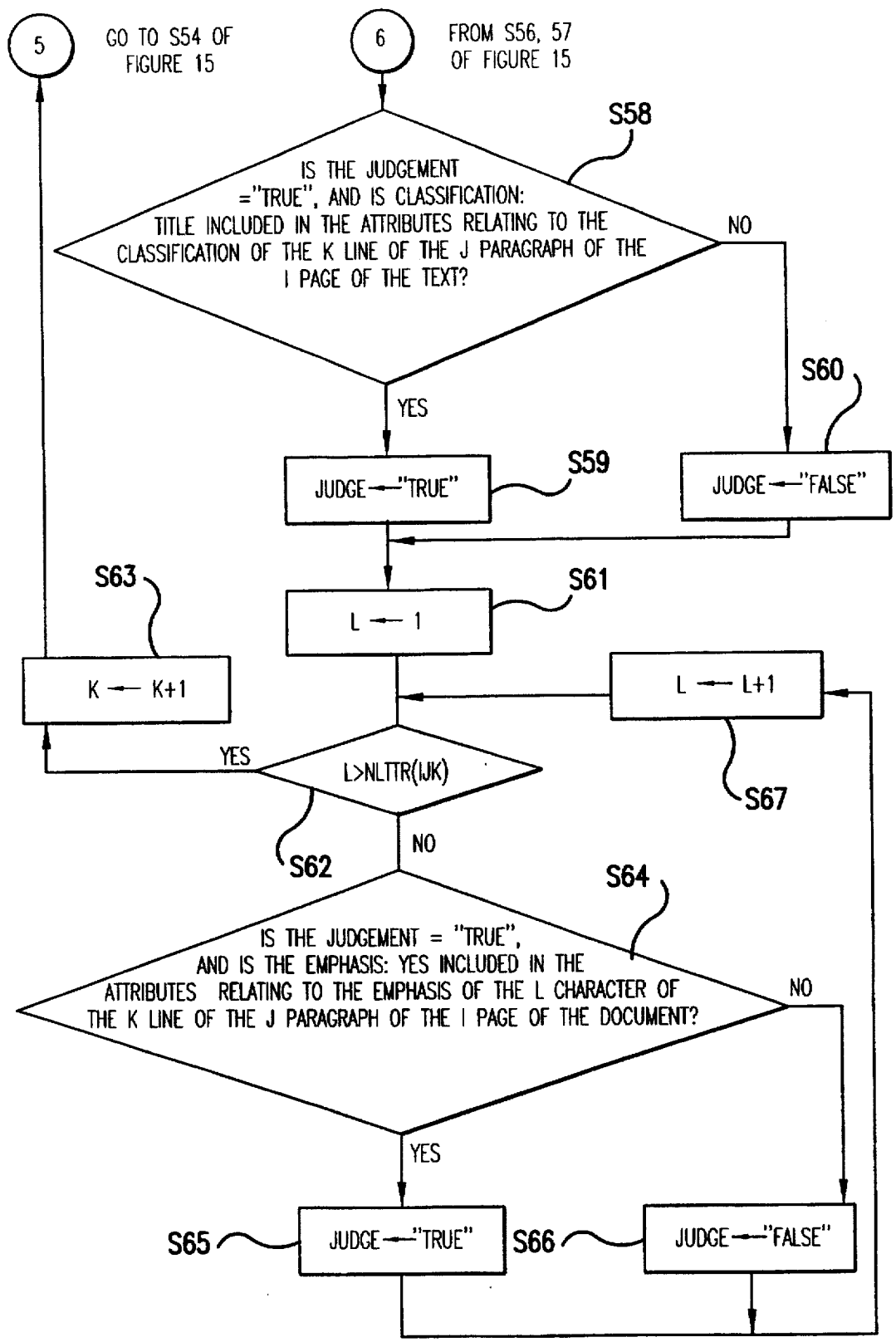
FIG. 16 is a flow chart which shows an example of the conversion rule (phase 3 continuation) when the output form is "paper" in an embodiment of the present invention.

Phase 3 (Steps S44–S71 of FIGS. 15 through 16)

By means of the attribute data of the text to be edited, namely, by searching the list 612 of FIG. 6, an examination can be made of the attributes and lower position structure of all of the paragraphs composing the text. To the extent that two or more lines comprise lower structure, and to the extent that in the attribute classification: title is included relative to the classification of the first line, and to the extent that in the attribute emphasis: yes relating to the emphasis of all of the characters composing the first line is included in the paragraph, then attributes relating to background color can be rewritten as background color: yellow. Even in phase 3, the variables obtained in phase 1 comprising NPAGE, NPARA (I), NLINE (I J), and NLTTR (I J K) comprising the parameters, and the JUDGE classification parameter can be used.

First, an examination is made (in S50) of the number of lines composing the individual paragraphs, and if the number of lines is 2 or more, then the value of the judgement becomes "TRUE" (in step S51), and if the number of lines is one, then the value of the judgement is "FALSE" (in step S52). Second, if the value of the JUDGEMENT is "TRUE", then if the first line is currently being examined, then the value of the judgement is "TRUE", (in step S56), and if this is not the case, then the value of the judgement is "FALSE" (in step S57).

Third, if the value of the judgement is "TRUE", if the attributes relating to the classification of the examined lines is classification: title, then the value of the judgement becomes "TRUE" (in step S59). If this is not the case, then the value of the judgement becomes "FALSE" (in step S60).

Finally, when the value of the judgement is "TRUE" and the attributes relating to the emphasis of all of the characters composing the examined lines are included in emphasis: yes, then the value of the judgement becomes "TRUE", (in steps S61, S62, S64, S65, and S67). If in the attributes relating to emphasis, emphasis: yes, is not included, namely if emphasis: none is included for even one character, then the value of the judgement becomes "FALSE" (in step S66). Only when the value of the judgement is "TRUE", are the attributes relating to the background of the paragraph changed to background color: yellow. If all of the paragraphs are handled in this fashion, then phase 3 is terminated.

Figure 8A:
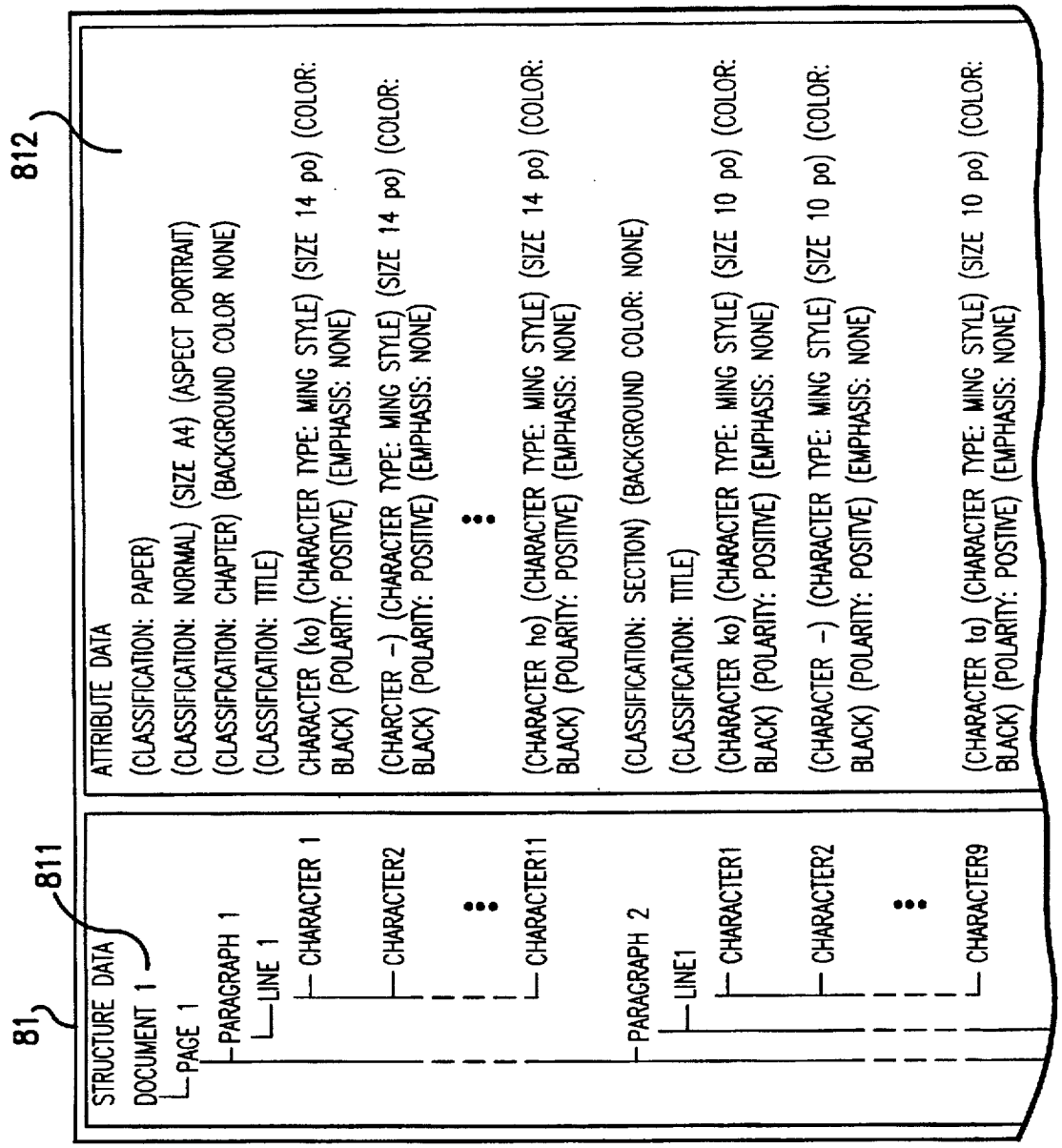
FIG. 8 is a diagram which shows text data in an embodiment of the present invention.
Figure 8B:
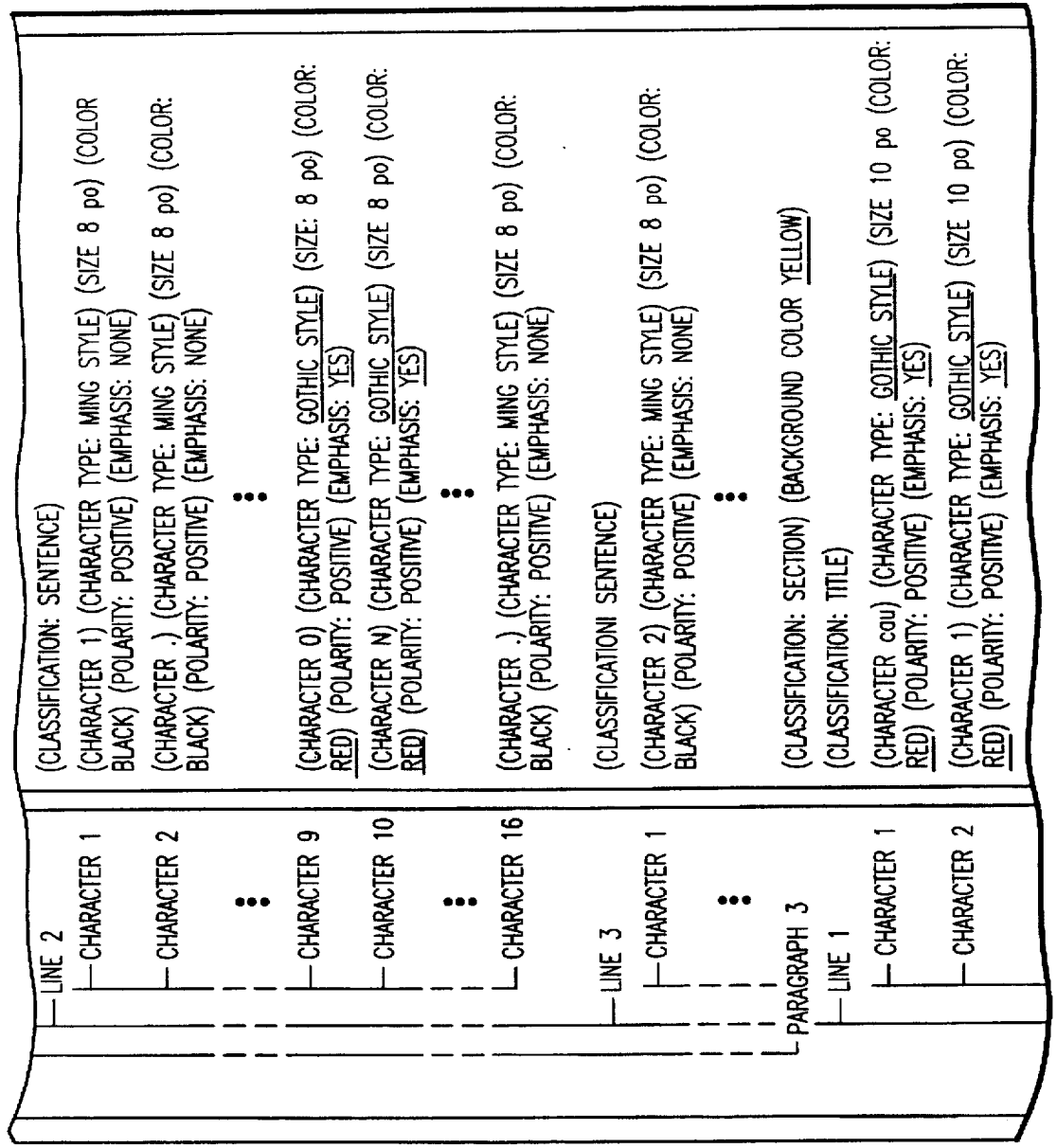
Figure 8C:
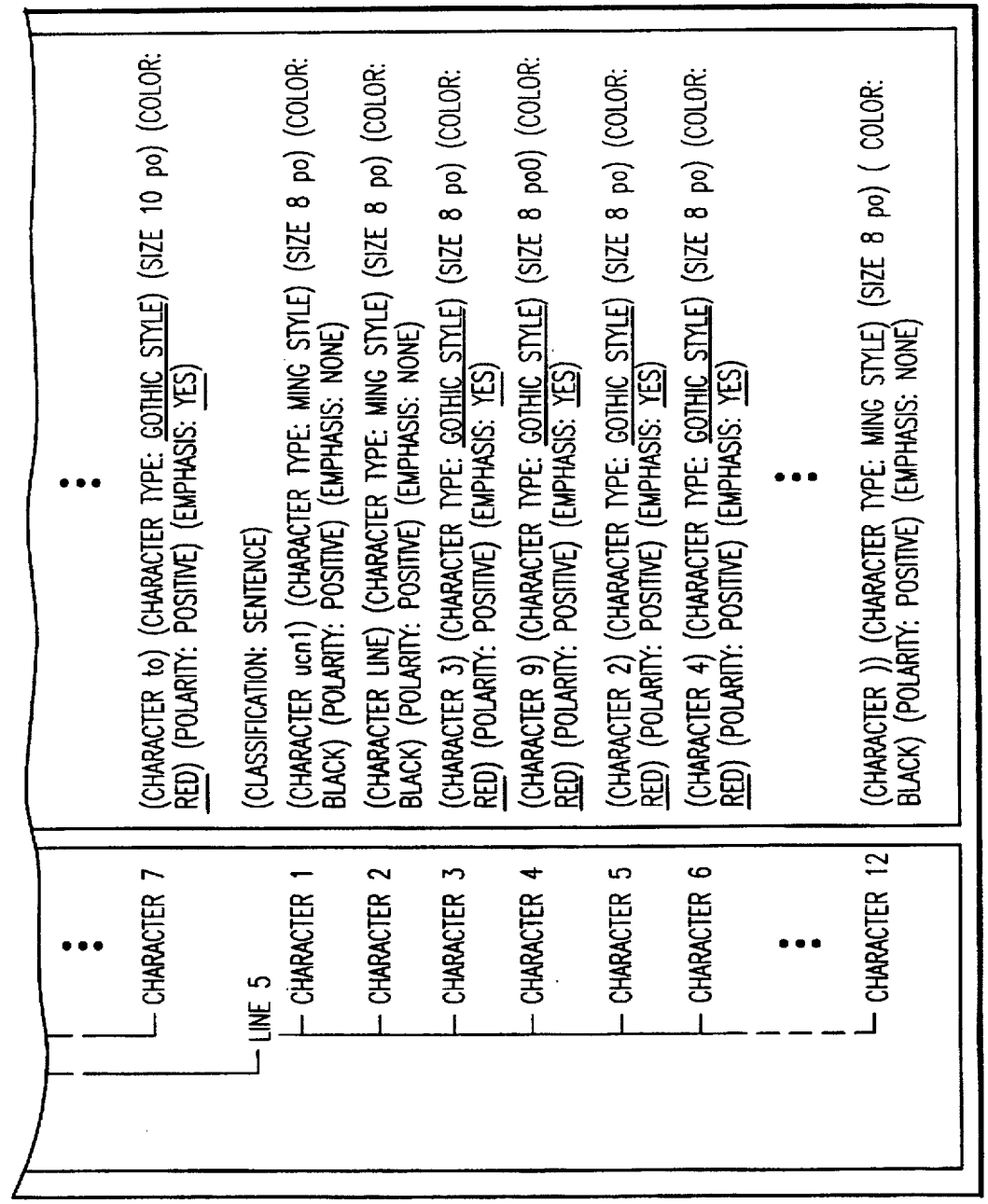

FIG. 8 shows a portion of the text data for which rewriting is accomplished in accordance with the "conversion rule when the output type is "paper"". In FIG. 8, items for which double underlining is applied are shown as having been rewritten (differing from the original data of FIG. 6). A portion of the attributes of the emphasis indicated data, as provided by the user, is changed from the character type: Ming style shown in FIG. 6 and color: black, and rewritten to become character type: Gothic and color: red as shown in FIG. 8. In addition, a portion of the attributes of "paragraph 3" are changed from the background color: none shown in FIG. 6 to become background color: yellow as shown in FIG. 8.

In other words, the character type (which has attributes including emphasis: yes) indicated in accordance with the emphasis that the user desires to place, becomes Gothic, and the color of the display of the character or the color in which the character is to be printed is converted to a red color. In addition, when an emphasis indication is accomplished relative to the title line of the paragraph composing the text, then the yellow background color is displayed in the region that includes the entire paragraph, and conversion is also accomplished relating to notations concerning the paragraph as indicated by the user. Also, new text data that has been converted in this manner is stored in the text data holding component 12, and corresponding text picture images are visually displayed to the user through the text picture image display 15.

The text image within the window shown in 712 of FIG. 7 corresponds to the newly rewritten text data of FIG. 8. Since the text picture image display component 15 of the present invention actualizes an assumption according to the display of the multiple colored system of a color CRT or color crystal screen, then fundamentally the color is displayed in accordance with the text element attribute values. However, even within a monochrome display (for example, a black and white display), confirmation is possible of the results of the converted text. For example, as shown in 712 of FIG. 7, as one display method for temporarily showing the emphasis in a black and white display, characters that should be shown in "red Gothic type" may be shown as characters of "black Gothic—bold type". "Yellow background color" can be displayed by a method wherein they are shown as "a relatively low dotted pattern (hunting) of a vacant frequency".

Next, an explanation will be provided with respect to how rewriting is accomplished when the output type input indication of the user is "OHP", showing how the text data shown in FIG. 6, namely, structure data 611 and attribute data 612, is rewritten.

Even in this instance, the user, through a user interface shown in FIG. 5, while referring to text picture images such as shown in 512 of the text comprising the text to be edited, can accomplish output type input indication and conversion input indication through the utilization of a mouse cursor shown in 513 and a virtual keyboard shown in 511.

Figure 9:
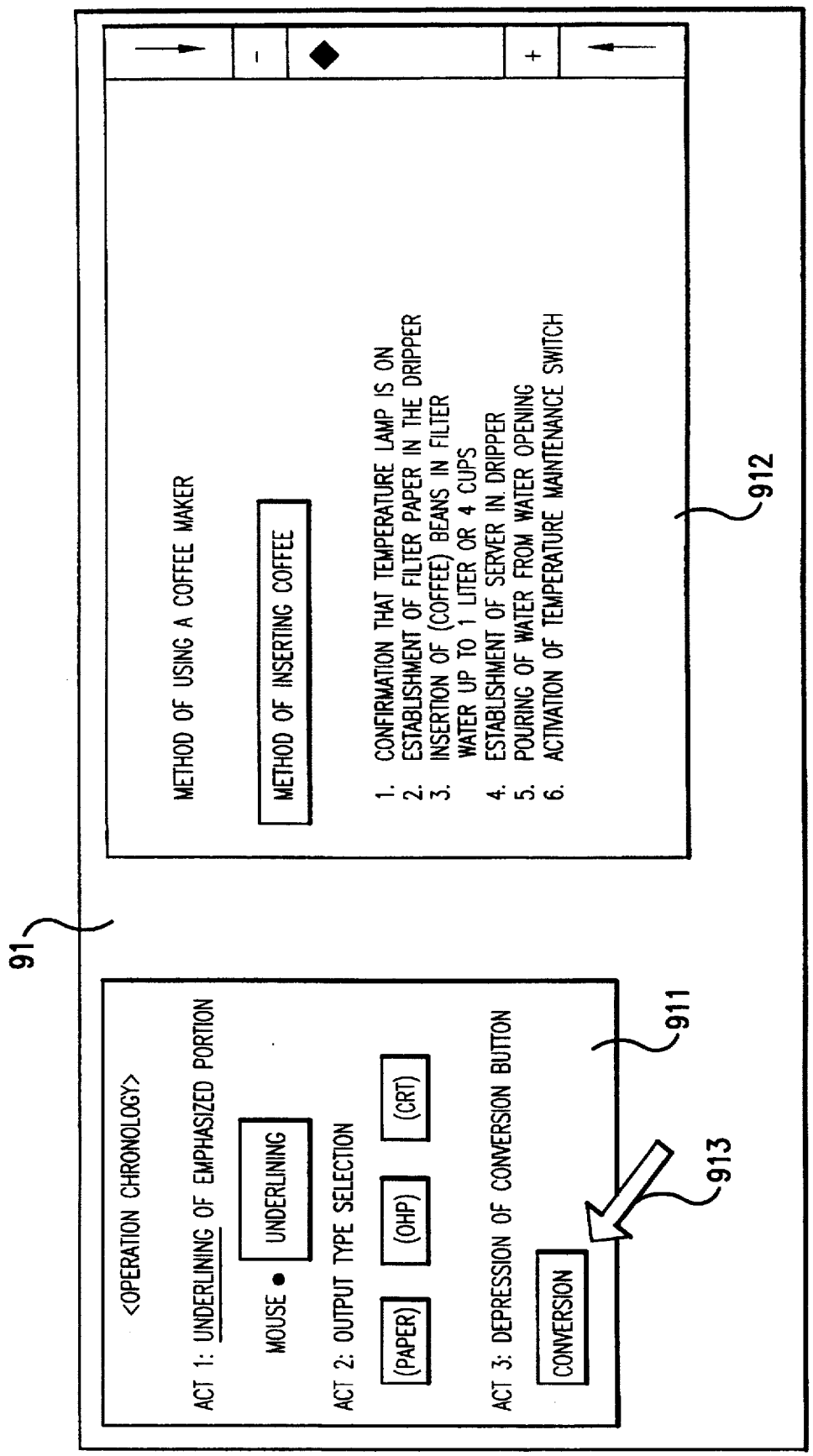
FIG. 9 is a diagram which shows an example of a user interface in an embodiment of the present invention.
Figure 10A:
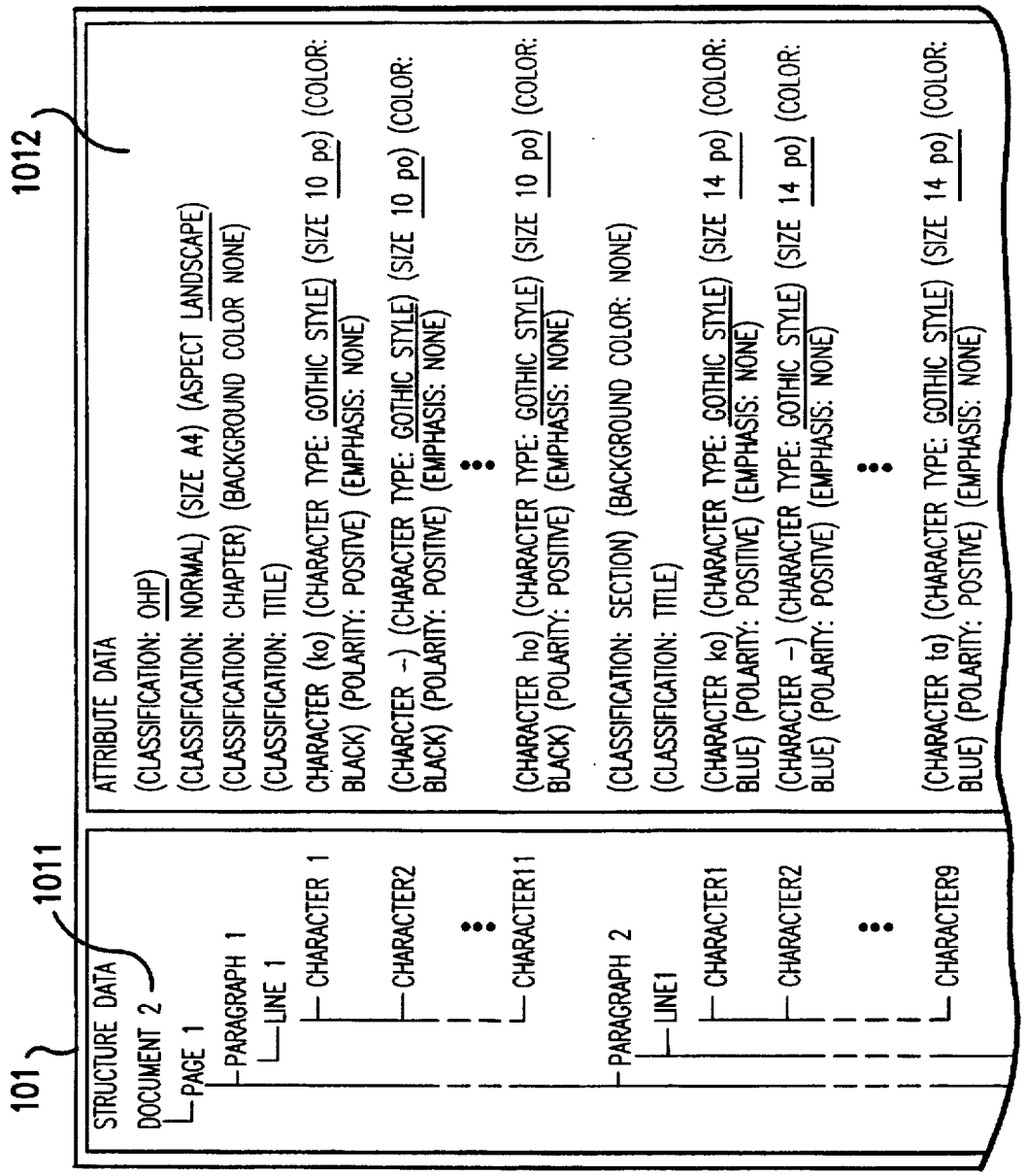
FIG. 10 is a diagram which shows an example of text data in an embodiment of the present invention.
Figure 10B:
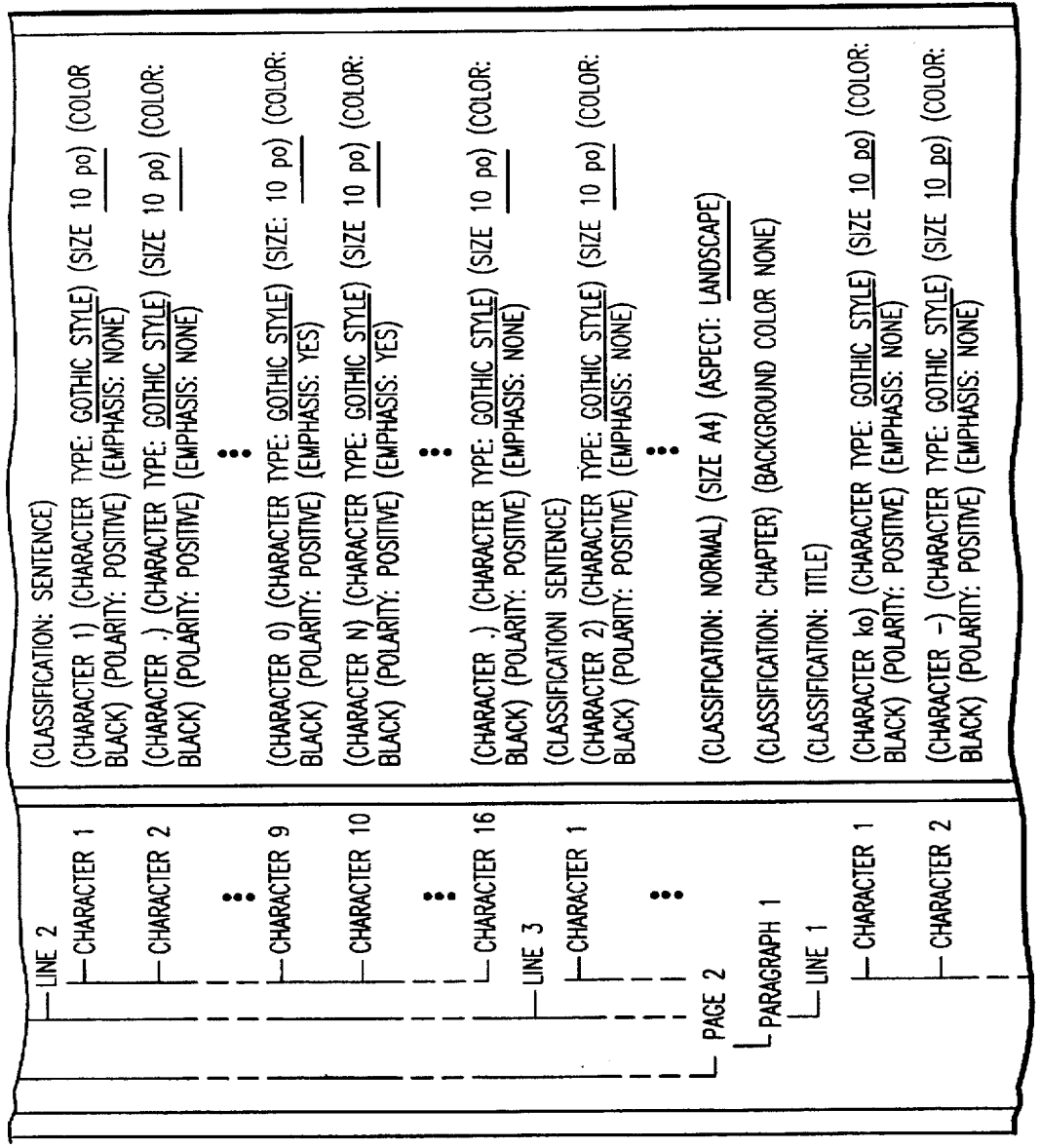
Figure 10C:
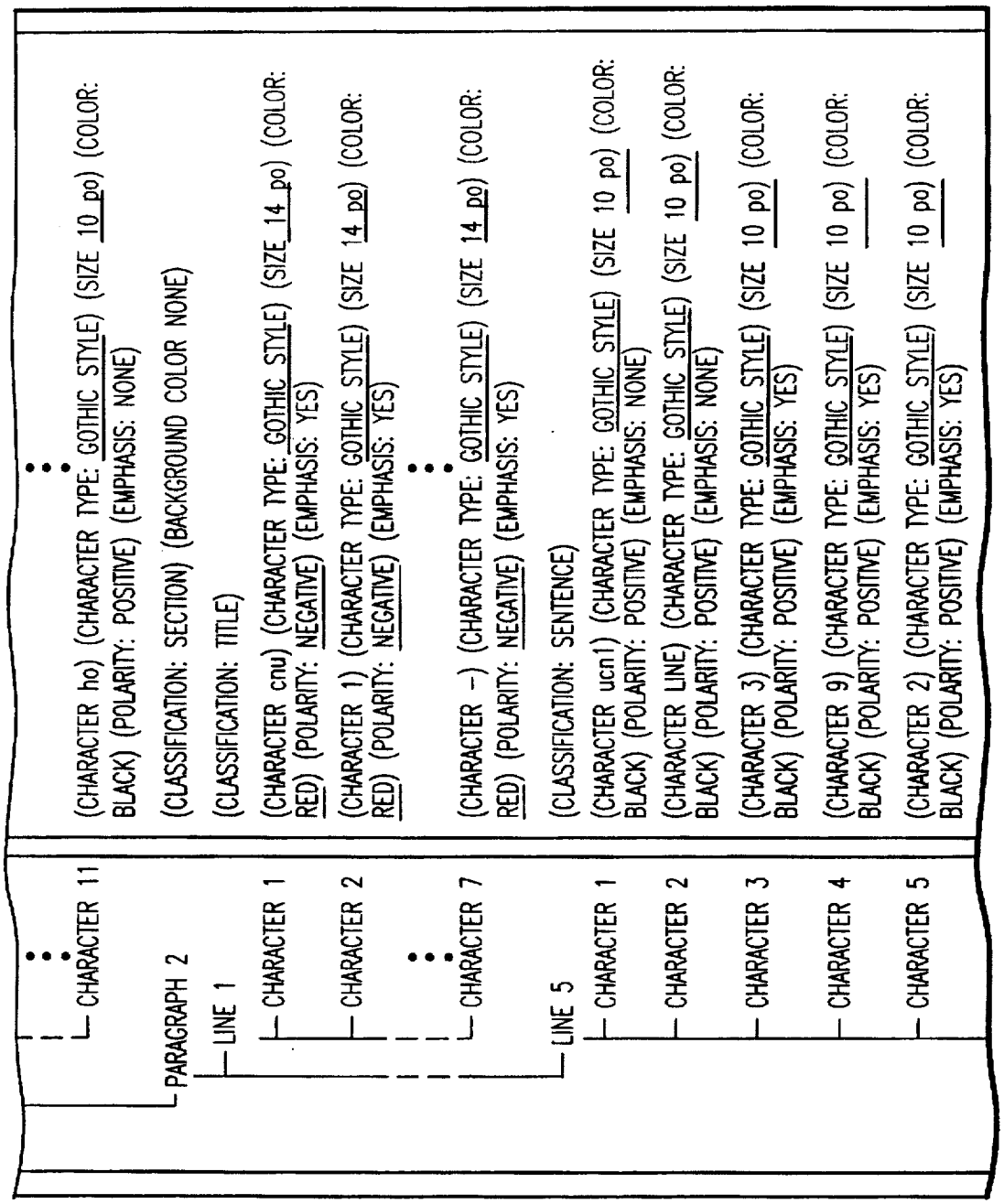
Figure 10D:
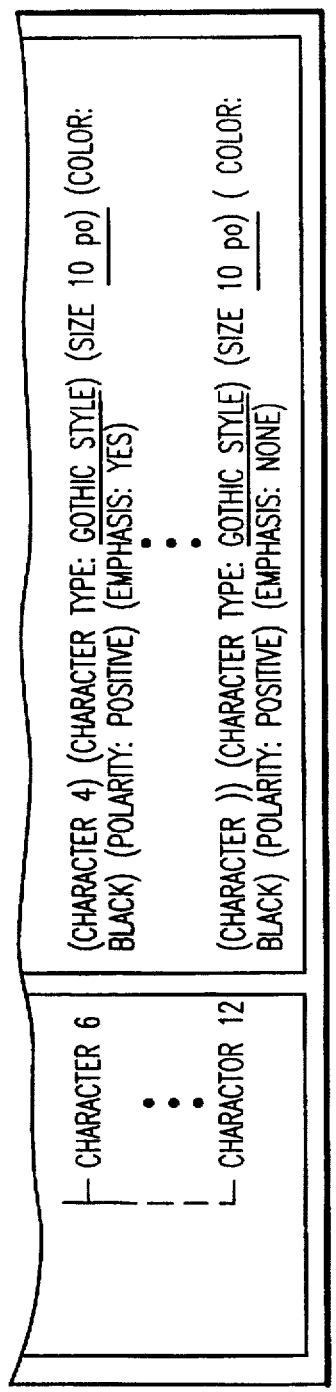

FIG. 9, as was the case with FIG. 5, is a scaled drawing of a user interface that is used for the purpose of providing a dialogue between the present invention and the user, and shows how the user accomplishes output type input indication, and conversion input indication. In FIG. 9, the user, while referring to explanatory messages displayed in virtual keyboard 911, for example "ACT 2 output type is selected", or "ACT 3 depression of conversion button", and through the operation of a mouse and a mouse button, by accomplishing the movement of the mouse cursor 913, first of all depresses the input button (in this instance, "OHP") indicating the desired output type. Next, an execution command button is depressed to attach a label to "conversion". Once accomplished, then access is made to the "conversion rule when the output type is "OHP"" as shown in FIGS. 12–13 and FIGS. 17–31, and rewriting is accomplished of the original data composing the text data of the document shown in FIG. 6.

The "conversion rule" applied when the output type is "OHP"" shown in FIGS. 12–13 and FIGS. 17–31 is composed of a series comprising "the rewriting chronology of the text element attributes" and "the rewriting chronology of the structure". This rewriting chronology can be divided into six phases, an explanation of the handling of which phases follows.

Phase 1 (Steps S1–S23 of FIGS. 12–13)

These phases are the same as the previously explained "conversion rule where the output type is "paper"" comprising the steps S1–S23. In other words, through the attachment of structure data of the text comprising the text to be edited, namely, by linking the nodes of 611 in FIG. 6, the number of "pages", "paragraphs", "lines", and "characters", composing the text can be counted. In this phase 1, I represents the parameters that control the chronological number of pages, J represents the parameters that control the chronological number of paragraphs, K represents the parameters that control the chronological number of lines, and L represents the parameters that control the chronological number of characters. For example, a search is accomplished (in S3) for the I lower position node of the "text" node (e.g. "document 1"). If a node is present, then substitution is made in step S4 for the value of I in the variable NPAGE. On the other hand, if no node is present, then a determination is made that there is no subsequent page, and the value of the variable NPAGE is not changed (and the program does not go to step S24). Repetition with respect to the "paragraphs", "lines", and "characters", can be accomplished for other paperwork of the same type. As a result of such handling, once phase 1 is finished, then the following variables can be obtained, and used as control parameters for continuing phases: NPAGE for the number of pages of text, NPARA (I) for the number of paragraphs composing the I page, NLINE (I J) for the number of lines composing the J paragraph of the I page, and NLTTR (I J K) for the number of characters composing the K line of the J paragraph of the I page. These NPAGE, NPARA (I), NLINE (I J), and NLTTR (I J K) can be used as control parameters for continuing phases.

Figure 17:
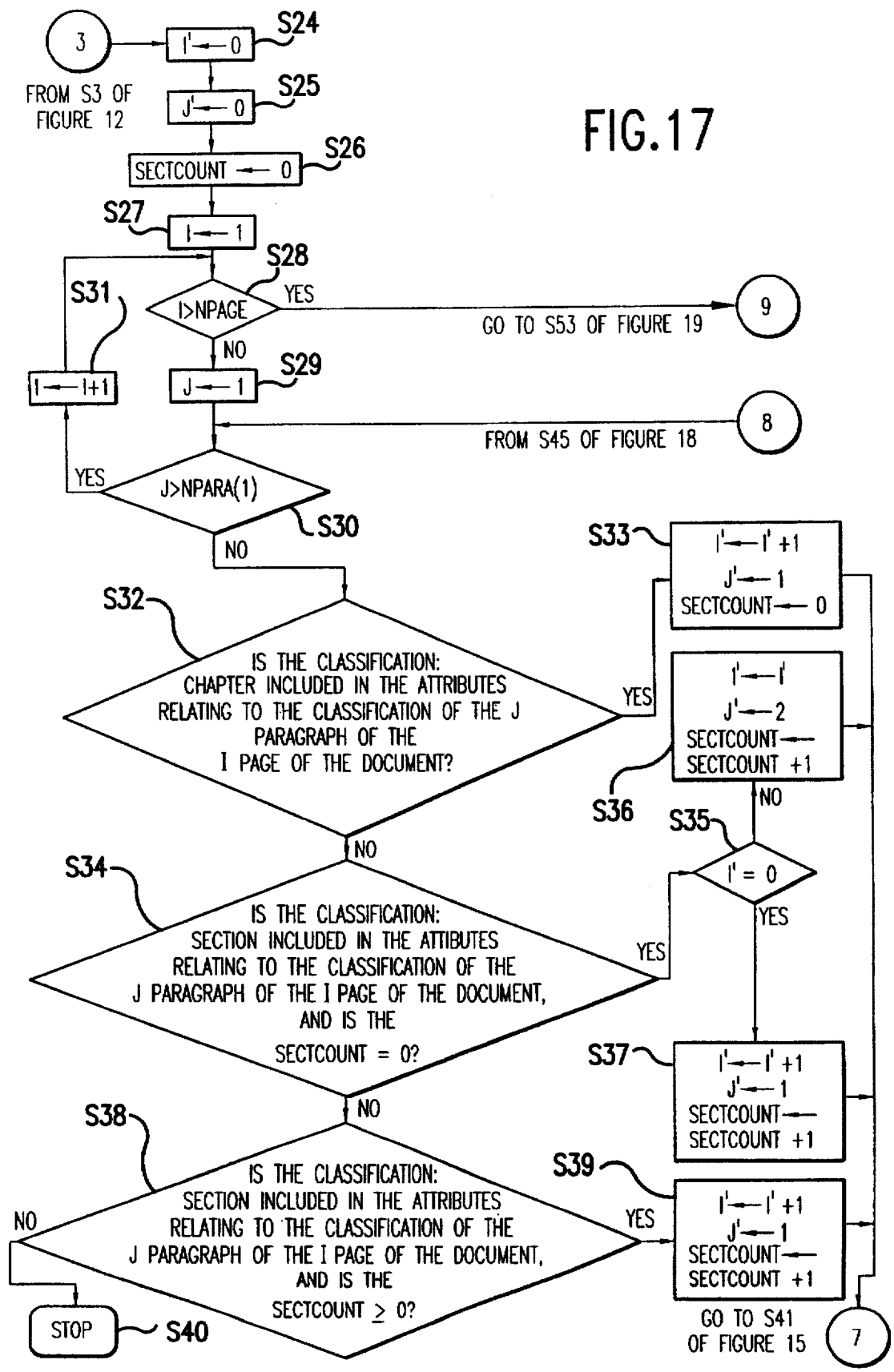
FIG. 17 is a flow chart which shows an example of the conversion rule (phase 2) when the output form is "OHP" in an embodiment of the present invention.
Figure 18:
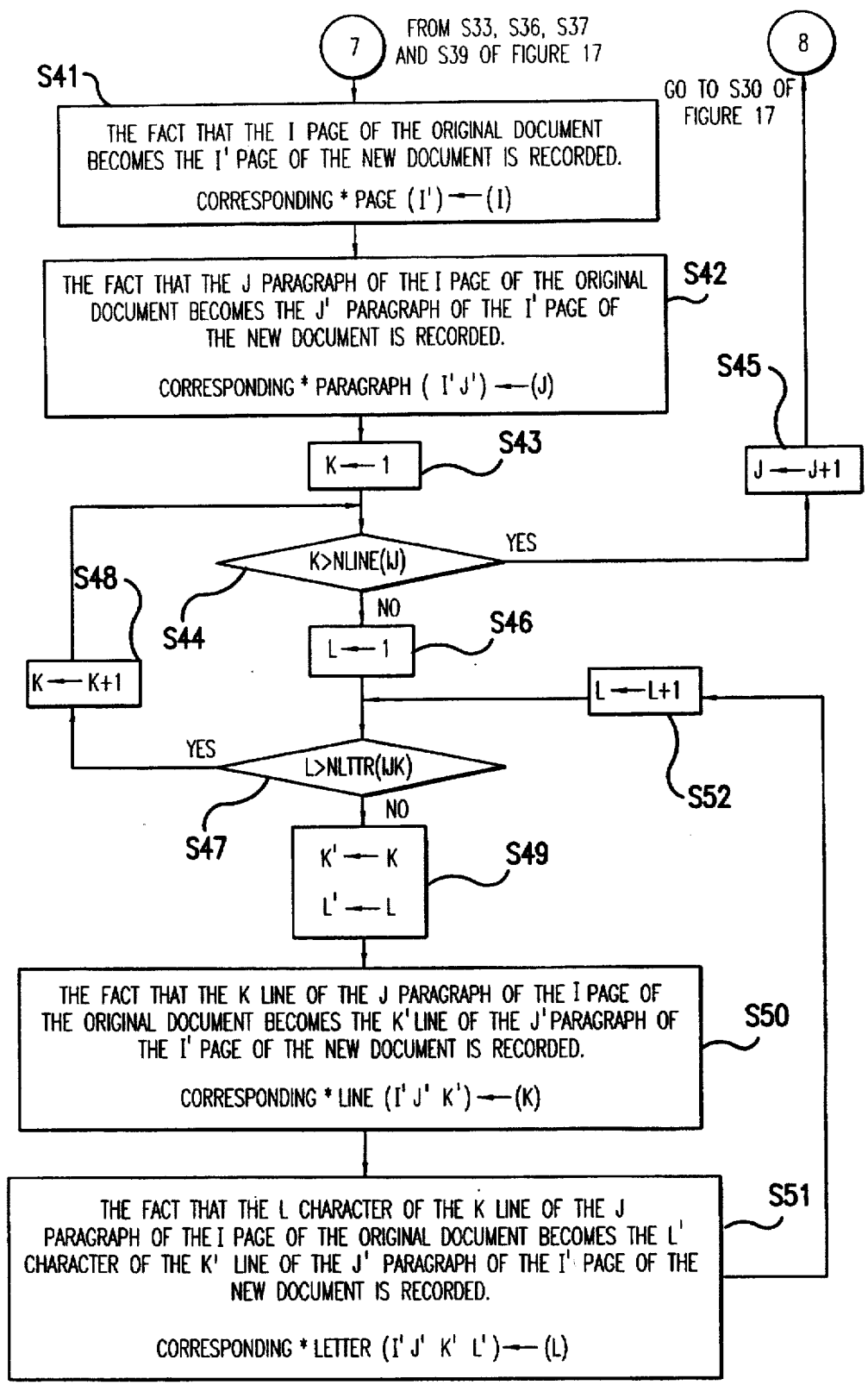
FIG. 18 is a flow chart which shows an example of the conversion rule (phase 2 continuation) when the output form is "OHP" in an embodiment of the present invention.
Figure 19:
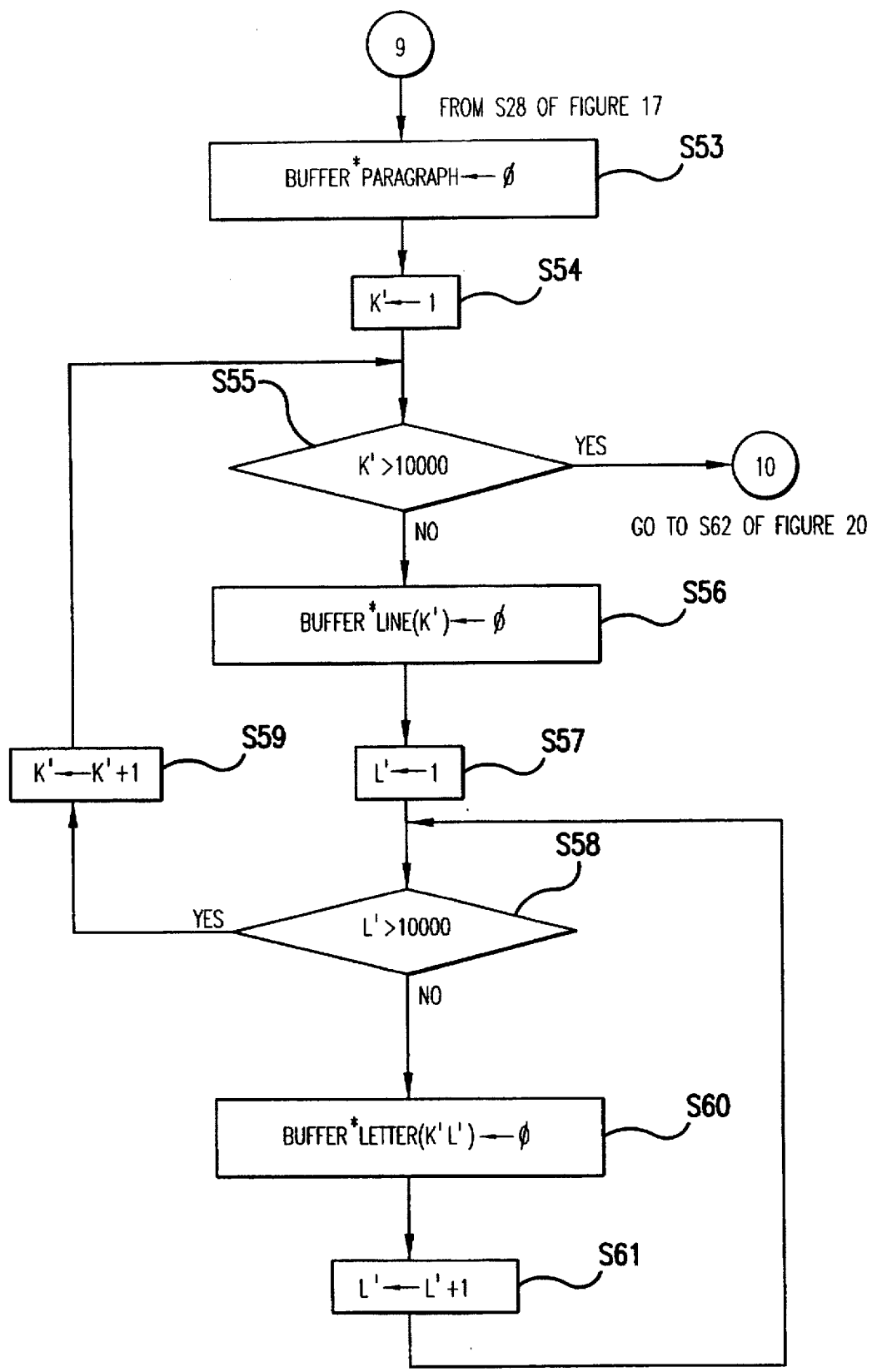
FIG. 19 is a flow chart which shows an example of the conversion rule (phase 3) when the output form is "OHP" in an embodiment of the present invention.
Figure 20A:
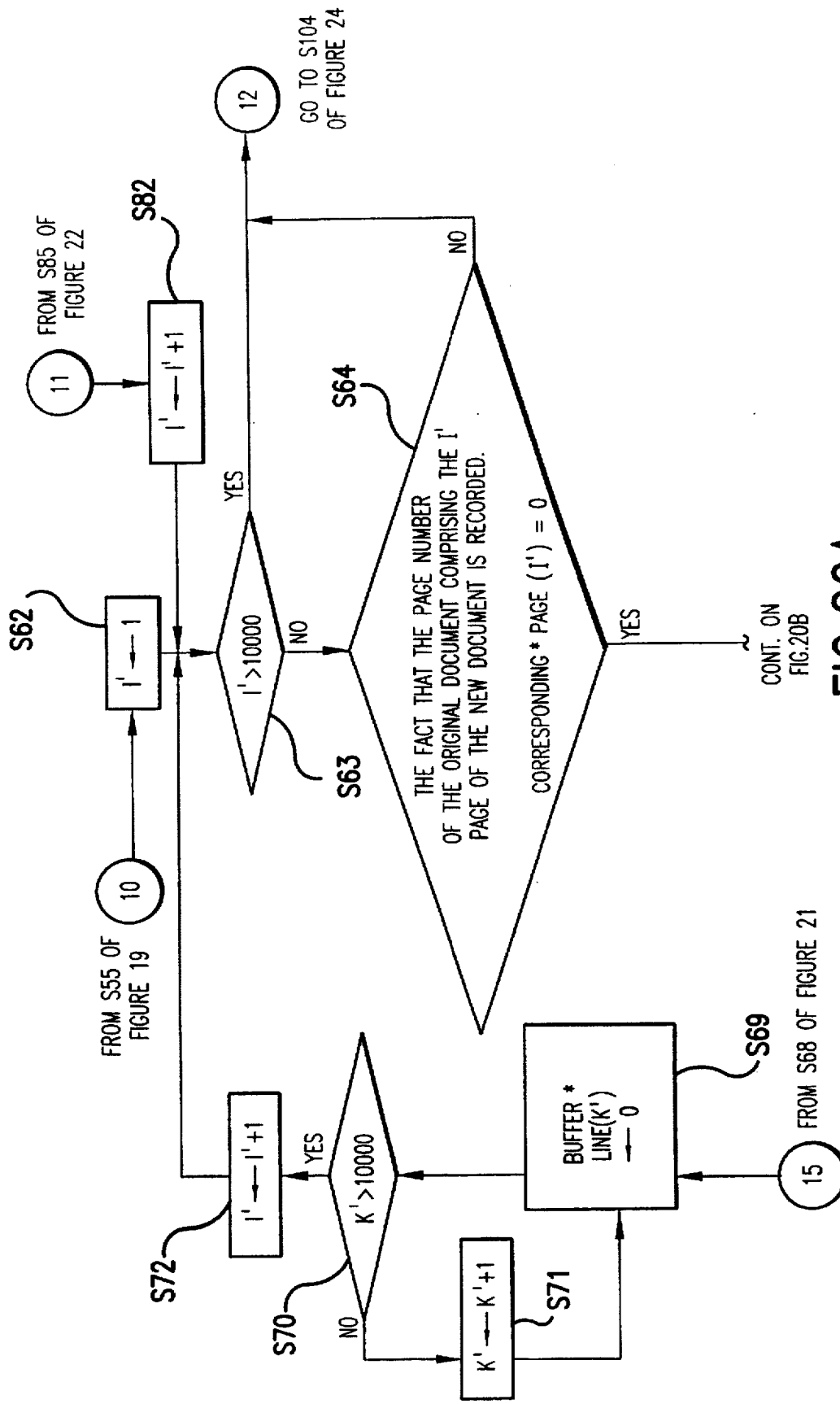
FIG. 20 is a flow chart which shows an example of the conversion rule (phase 3 continuation) when the output form is "OHP" in an embodiment of the present invention.
Figure 20B:
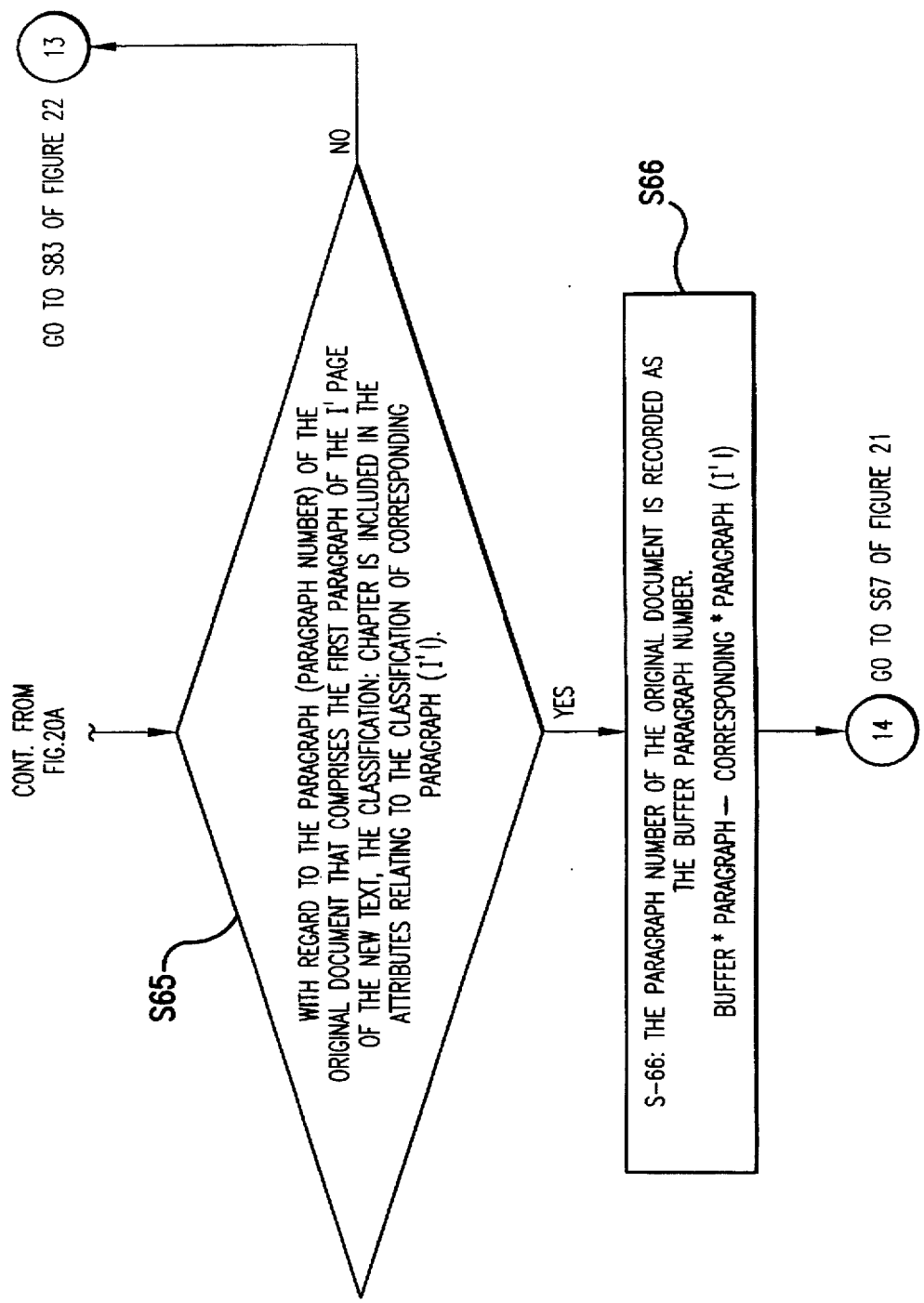
Figure 22A:
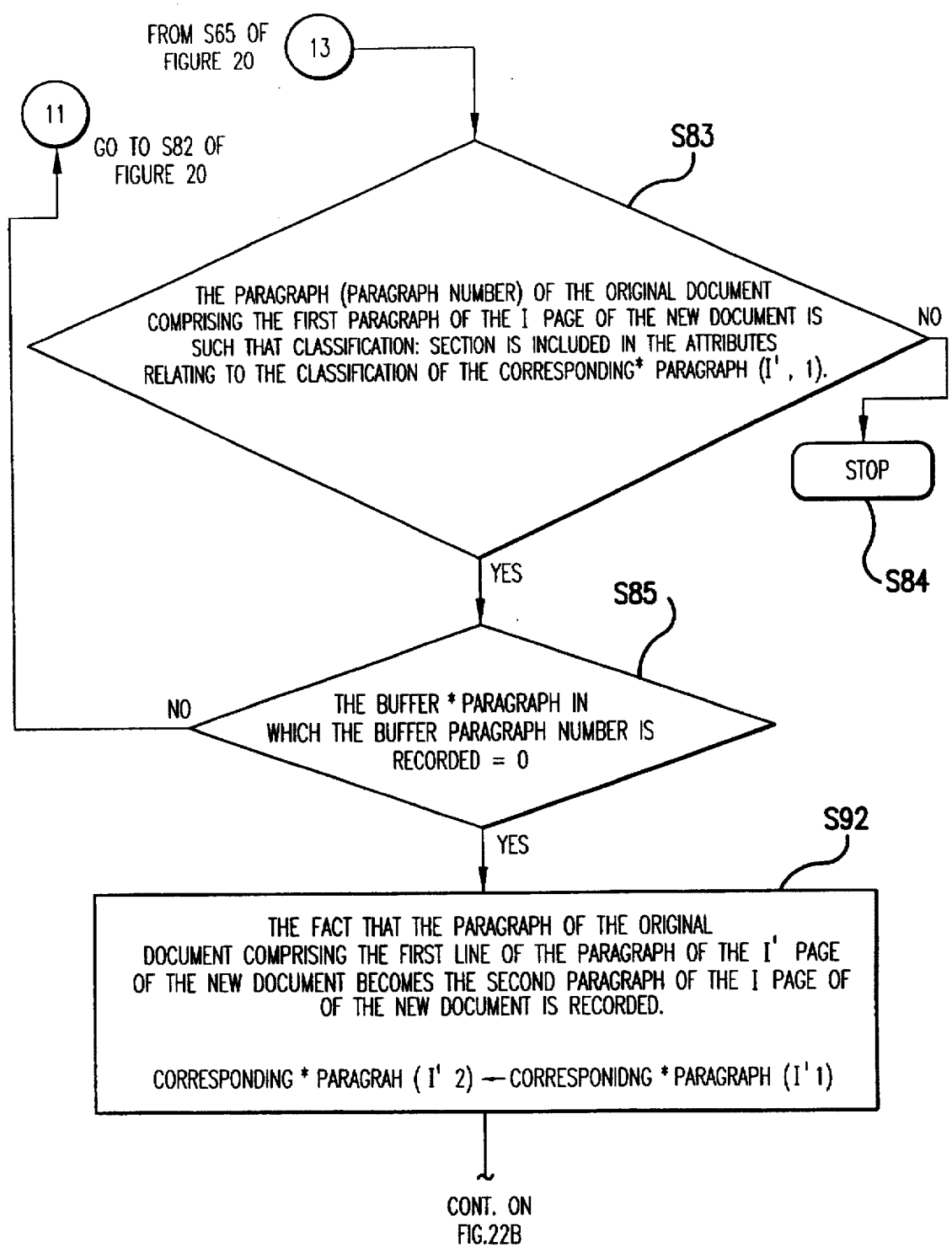
FIG. 22 is a flow chart which shows an example of the conversion rule (phase 3 continuation) when the output form is "OHP" in an embodiment of the present invention.
Figure 23:
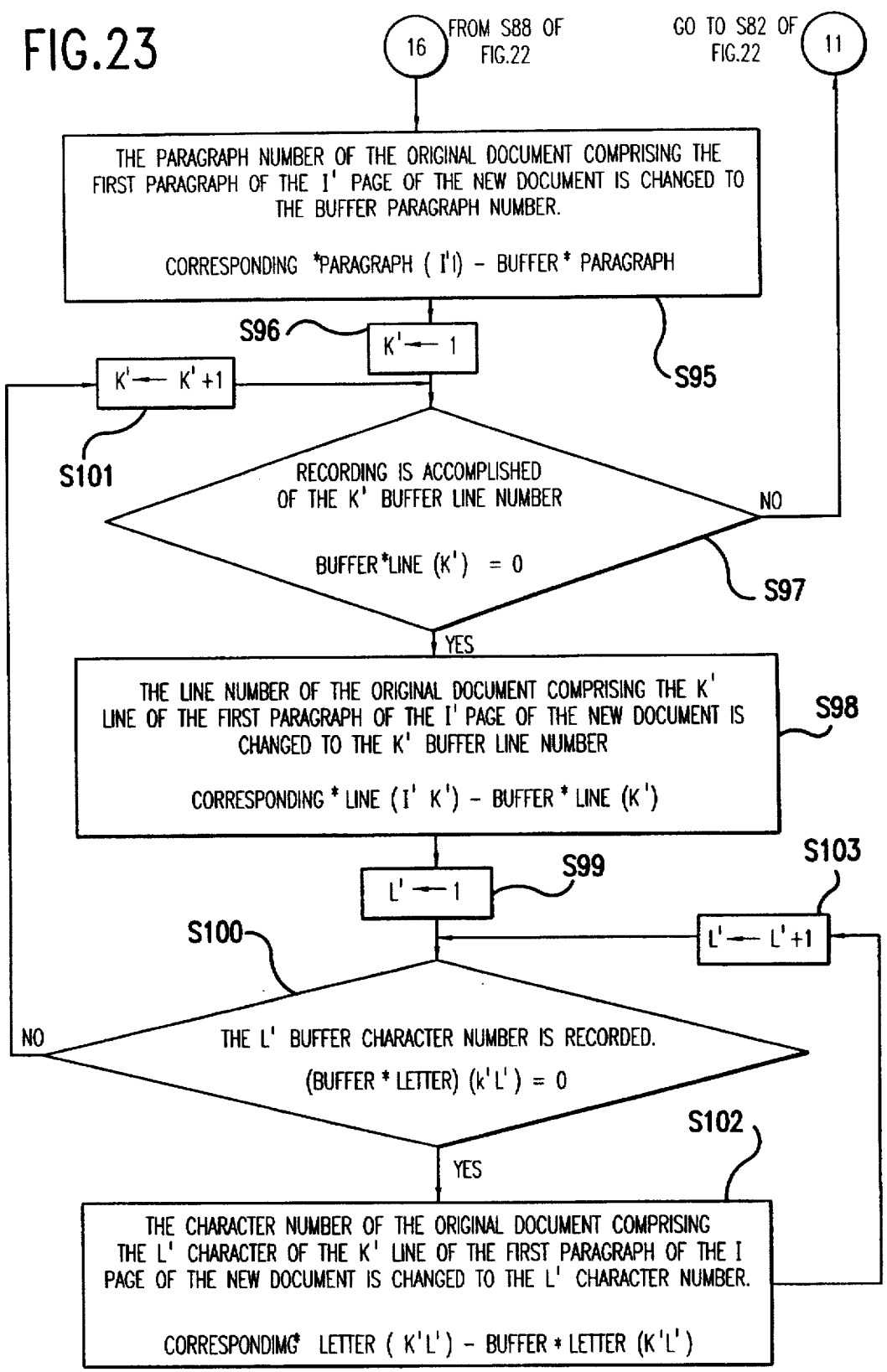
FIG. 23 is a flow chart which shows an example of the conversion rule (phase 3 continuation) when the output form is "OHP" in an embodiment of the present invention.

Phase 2 (S24–S52 of FIGS. 17–18)

With the attribute data of the text to be edited, namely, by searching the list 612 of FIG. 6, the lower position structure of all of the pages composing the text and the attributes can be examined. In this instance, "divisions of the pages", and "integration" of the pages can be accomplished in accordance with the composition of each page, thereby obtaining the structure of the division/integration of the previous original text, and the division/integration of the new page. Also, at this point, the text data itself, namely the structure data, and the attribute data re-writing is not yet executed. The divisions of the pages and the integration of the pages are determined as a lower position structure for a number of chapters and sections. Also, the chapter paragraphs comprise paragraphs that include attributes relating to classification: chapters, and the sections are paragraphs that include attributes relating to classification: section.

In phase 2, I represents control parameters for the chronological number of pages of the original text, J represents the control parameters for the chronological number of paragraphs of the original text, K represents the control parameters for the chronological number of lines of the original text and L represents the control parameters for the chronological number of characters of the original text. On the other hand, I' represents control parameters for the chronological number of pages of the new text, J' represents control parameters for the chronological number of paragraphs of the new text, K' represents control parameters for the chronological number of lines of the new text and L' represents the chronological number of characters of the new text. Furthermore, execution is accomplished of a search of the list comprising the control parameters of PAGE NPARA (I), NLINE (IJ), and NLTTR (IJK) obtained in phase 1, and through the variable SECTCOUNT, a count is accomplished of the continuing numbers of sections. The value of SECTCOUNT is reset to 0 at the point in time at which the chapters are confirmed, and at the point in time at which confirmation is made of the number of sections, they are added one by one.

For example, since the text data of the original text is such that the first page (only one) composing the text is composed of one chapter and two sections, then this page is handled by means of "division".

First, since the first paragraph of the first page of the original text is a chapter paragraph (yes in S32), then this paragraph becomes the first paragraph of the first page of the new text (in S33 I=1, J=1, I'←0+1, J'←1). The value of the SECTCOUNT is reset to 0 (in S33, SECTCOUNT←0). Second, the 2nd paragraph of the first page of the original text is a section paragraph. Therefore, the value of the SECTCOUNT is 0 (yes in S34), and the value of I' is not 0 (no in S35), because the first paragraph of the first page of the new text has been determined. Therefore, this paragraph becomes the second paragraph of the first page in the new text (in S36, I=1, J=2, I'←1, J'←2). The value of the SECTCOUNT is increased by 1, becoming 1 (in S36, SECTCOUNT←+1).

Third the third paragraph of the first page of the original text is a section. Therefore, since the value of the SECTCOUNT is 1 (yes in S38), this paragraph becomes the first paragraph of the second page in the new text (in S39, I=1, J=3, I'=1+1, J'=1). The value of the SECTCOUNT is then increased by 1, becoming 2 (in S39, SECTCOUNT←1+1). In other words, in this instance, the first page of the original text becomes the 2nd page in the new text. The structure of the text is converted from the page "Chapter paragraph plus section paragraph plus section paragraph" to the page "Chapter paragraph plus section paragraph" plus the page "Section paragraph".

Unlike FIG. 6, in a composition wherein the I page of the original document comprises one chapter paragraph, in the case where the (I+1) page composes one section paragraph, the page comprising the I page and (I+1) is combined into one page, conversely producing an "integration" of the page. If the chapter paragraph of the I page of the original document is confirmed, then (in step S32) a page number is added to the new document, and its chapter paragraph becomes the first paragraph of the (I'+1) page in the new document, and the value of the SECTCOUNT is reset to 0 (in S33, I' left arrow I'+1, J' left arrow 1, SECTCOUNT left arrow 0). Next, if the section paragraph of the (I+1) page of the original document is confirmed, then since the value of the SECTCOUNT is 0 (yes in step S34), then addition of the page number is not accomplished, and the section paragraph becomes the second paragraph of the same page as the prior chapter paragraph (in step S36, change is accomplished wherein I' left arrow I', J' left arrow 2). In other words, in this instance, the second page of the original document becomes the first page in the new document. The structure of the text is converted from "chapter paragraph" page+"section paragraph" page to become "chapter paragraph+section paragraph" page.

Furthermore, when the I page of the original document is composed of one chapter paragraph, and when the (I+1) page is ≧2 and when the first paragraph is a section paragraph, then the "division" (proportioning) of the page and the "integration" of the page are simultaneously accomplished. For example, when the I page of the original document is composed of a single chapter, and the first paragraph of the (I+1) page is a section paragraph, then if the second paragraph of the (I+1) page is a chapter paragraph or a section paragraph, then handling is executed as indicated hereafter. Namely, if the chapter paragraph of the I page of the original document is confirmed (in step S32) then a page number is added to the new document. The chapter paragraph then becomes the first paragraph of the (I+1) page in the new document, and the value of the SECTCOUNT is reset to 0 (in step S33, I left arrow I+1, J' left arrow 1, SECTCOUNT left arrow 0).

If the first paragraph (the section paragraph) of the (I+1) page of the original document is confirmed, then since the value of the SECTCOUNT is 0 (in step S34), then no addition is accomplished of a page number, and the section paragraph becomes the second paragraph (in step S36) of the same page as the previous chapter paragraph, wherein change is accomplished by (I←I', J'←2). In this instance, the SECTCOUNT becomes 1 (in step S36, SECTCOUNT←0+1).

Also, if the second paragraph (this may be either a chapter paragraph or a section paragraph) of the (I+1) page of the original document is confirmed, then, since it is either classified as a chapter (yes in step S32) or as a section wherein the value of the SECTCOUNT is 1 (yes in step S38), 1 is added to the page number, becoming the first chapter of the next page in the new document (in step S33 and step S39, I←I+1, J'←1). In other words, in this instance, the second page of the original document also becomes the second page in the new document, however, its structure is converted from "chapter paragraph" page + "section paragraph + chapter/section paragraph" page to become "chapter paragraph + section paragraph" page + "chapter/section paragraph" page.

In other words, pages composed in the manner shown below in the original document do not exist in the new text following division/integration.

Pages that have two or more paragraphs with lower position structure.

Pages that have two or more sections with lower position structure.

Pages that have a single paragraph, and a single section with lower position structure, and when the first paragraph is a section, then the second paragraph is a chapter.

In other words, in phase 2, in the new document, a relationship is sought that would permit only pages having the following three types of structure regarding the relationship between the original document and the new document.

Pages that have only one chapter paragraph with a lower position structure.

Pages that have only one section paragraph with a lower position structure.

Pages that have one section paragraph and one chapter paragraph with lower position structure, and when the first paragraph is a chapter paragraph, the second paragraph is a section paragraph.

Furthermore, since the division and integration of lines and characters is not accomplished in a single cut, ordinarily the value of K and the value of K' are equal, and ordinarily the value of L, and the value of L' are also equal (in step S49). Hence changes are recorded that correspond to the structure of the original document prior to division/integration, and to the structure of the new document following division/integration. In other words, the correspondence between I and I', the correspondence between J and J', the correspondence between K and K', and the correspondence between L and L' are recorded (in steps S41, S42, S50 and S51) as the variables Corresponding * page (I'), Corresponding * paragraph (I' J'), Corresponding * line (I' J' K') and Corresponding * letter (I' J' K' L').

Phase 3 (Steps S53–S103) of FIGS. 19–23.

By means of the attribute data of the text to be edited, in other words by means of searching the list 612 of FIG. 6, an examination can be made of the lower position structure and attributes of all of the pages composing the text. In this instance, through the addition (repetition) of the chapter paragraph that has already been put out to the "page in which only one section paragraph is of lower position structure" within the new created text, that page can be handled in order to change so that "the first paragraph is the chapter paragraph, and the second paragraph is a section paragraph page".

In other words, to the extent that the page is composed only of a paragraph that includes, classification: section, then the paragraph that includes classification: chapter comprises the first paragraph of the page, and the paragraph, that includes classification: section slides to the second paragraph of the page. In this instance, the paragraph, which includes classification: chapter is the chapter paragraph that comprises the lower position structure of the page previous to this page, is copied. However, such handling, as was the case in phase 2, has as its objective obtaining a relationship between the structure of the original prior to division/integration, and the structure of the new text following division/integration, and the rewriting of the text data itself, i.e. the rewriting of structure data and attribute data is not performed.

In phase 3, I' comprises the parameters that control the chronological numbers of the new pages, J' represents the parameters that control the chronological numbering of the paragraphs of the new text, K' represents the parameters for controlling the chronological numbers of the lines of the new text, and L' represents the parameters for controlling the numbers of the new characters. In addition, corresponding to the structure of the original text prior to division/integration, and the structure of the new text following division/integration, the variable obtained in phase 2 comprising Corresponding * page (I'), Corresponding * paragraph (I' J'), Corresponding * line (I' J' K') and Corresponding * (I' J' K' L') are recorded, and at the time of changing the composition of the page repeating the chapter paragraph, these values are all changed. Furthermore, in order to record the paragraph number of the chapter paragraph for which repetition is possible in the new document, and the chapter paragraph number of the original text, a buffer variable BUFFER * paragraph is used. In order to record the line number of each line composing the chapter paragraph for which repetition is possible in the new text, and the line number of the original text, a buffer variable BUFFER * line (K') is used. In order to record the character number of each of the characters of the lines composing the chapter paragraphs for which repetition is possible in the new text and the character numbers of the original document, a buffer variable BUFFER * letter (K' L') is used.

First, in order to clear the body of the third type of buffer variable, all of the values are empty in steps S53–S61. Second, an examination is made of the attribute data of the paragraphs (the corresponding paragraph numbers are stored as the variable Corresponding * paragraph (I' 1)) of the original text comprising the first paragraph of the I' page of the new document. Confirmation is made as to whether they are included in a subordinate manner to the classification: chapter, i.e. confirmation is made as to whether or not they are chapter paragraphs (in step S65). If these paragraphs are chapter paragraphs, then the paragraphs following subsequent handling, can be repeated (becoming the first chapters of a page comprising the lower position structure of only one section). In this instance, the chapter number Corresponding

* paragraph (I' 1) in the original text of this paragraph is stored in the buffer variable Buffer * paragraph; the line number Corresponding * line (I' 1 K') in the original text of each of the lines composing the paragraph is stored in the buffer variable Buffer * line (K'); and the character number Corresponding * letter (I' 1 K' L') in the original text of each of the characters of each of the lines composing the paragraph is stored in the buffer variable Buffer * (K' L') respectively (in steps S66, S73, and S76). In this instance, since the number of characters that compose the paragraph is diverse, when rewriting the body of the buffer variable (the previous writing) it is important not to forget to clear (setting the value to open the body of the excess buffer variables (in steps S69–S71, and S78–S80).

Third, when the paragraph of the original text that becomes the first paragraph of the I' page of the new text is not a chapter paragraph, in other words, when it is a section paragraph, this paragraph becomes the second paragraph of the I' page of the new text, and the chapter paragraph recorded in the buffer is handled so that it becomes the first paragraph of this page. Namely, the paragraph of the original text that was intended to become the first paragraph of the I' page of the new text substitutes the values stored in the variable Corresponding * paragraph (I' 1) in lieu of the variable Corresponding * paragraph (I' 2) (in step S86) in order to record it as the second paragraph of the I' page of the new document. Also with respect to each of the lines and characters composing the same paragraph, these are handled in the same manner (in steps S89 and S93). Next, the paragraph numbers of the chapter paragraphs that can be repeated are recorded, and chapter paragraph numbers of the original document, and the values stored in the buffer variable Buffer * paragraph are substituted for the variable Corresponding * paragraph (I' 1). By this means the paragraph numbers of the original text corresponding to the first paragraph of the I' page of the new document are recorded (S95). Also the lines and characters corresponding to the same paragraph are handled in the same manner (in steps S98, and S102). Furthermore, when the buffer paragraph number values are open then, since the chapter paragraph cannot be made the first paragraph of the page, as indicated above, there is no handling of them (no in step S85, the program moving to the next page).

If execution is accomplished relative to all of the pages of the new document, then in order to permit only the composition of two types as indicated below, then a relationship must be obtained in advance corresponding to the composition of the original text prior to division/integration; and the composition of the new text following division/integration.

A page that has a lower position composition of only the first chapter paragraph.

A page in which there is both lower position composition of the first chapter paragraph and the first section paragraph, and when the first paragraph is a chapter paragraph, the second paragraph is a section paragraph.

Also, when there exists characteristics such that the first paragraph of the first page composing the new text is a section paragraph, then the page having the next kind of composition that ordinarily would have been eliminated is caused to remain.

A page that has a lower position composition for only one section.

The correspondence between the structure of the original text prior to division/integration and the composition of the new text that follows division/integration, i.e. the relationship between I and I', the relationship between J and J', the relationship between K and K' and the relationship between L and L' are recorded as the variables Corresponding * page (I'), Corresponding * paragraph (I' J'), the Corresponding * line (I' J' K') and the Corresponding * letter (I' J' K' L').

Figure 24:
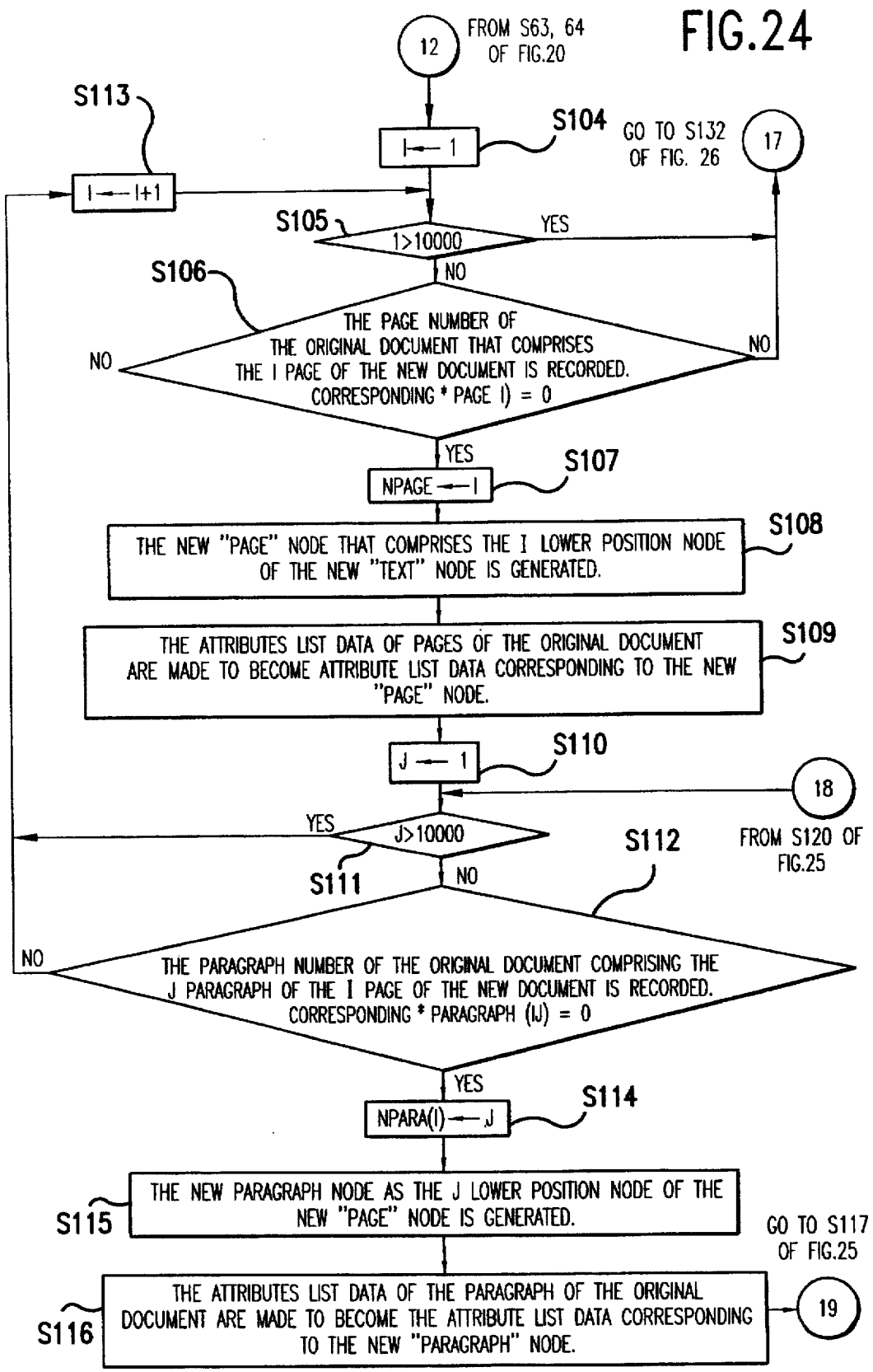
FIG. 24 is a flow chart which shows an example of the conversion rule (phase 4) when the output form is "OHP" in an embodiment of the present invention.
Figure 25A:
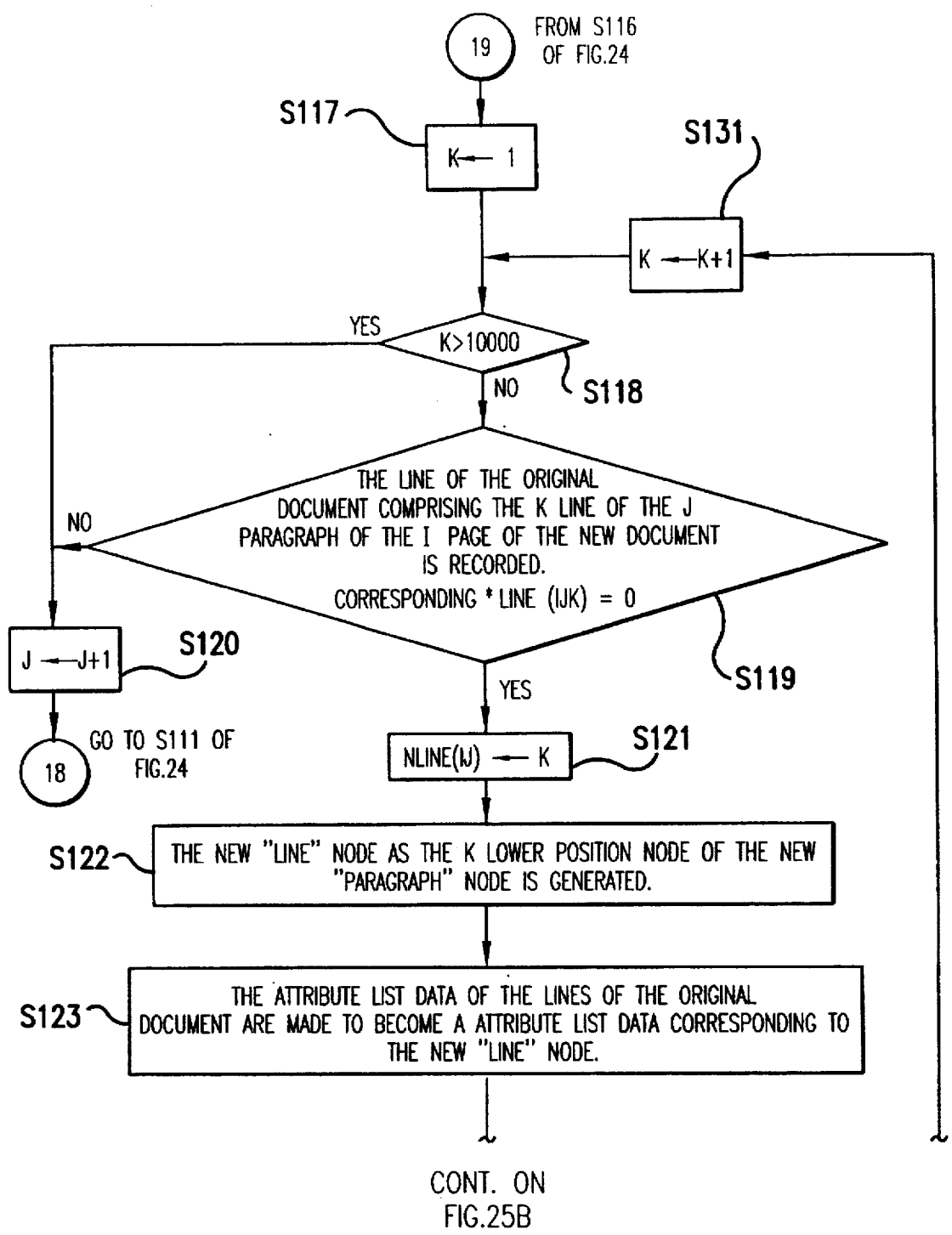
FIG. 25 is a flow chart which shows an example of the conversion rule (phase 4 continuation) when the output form is "OHP" in an embodiment of the present invention.
Figure 25B:
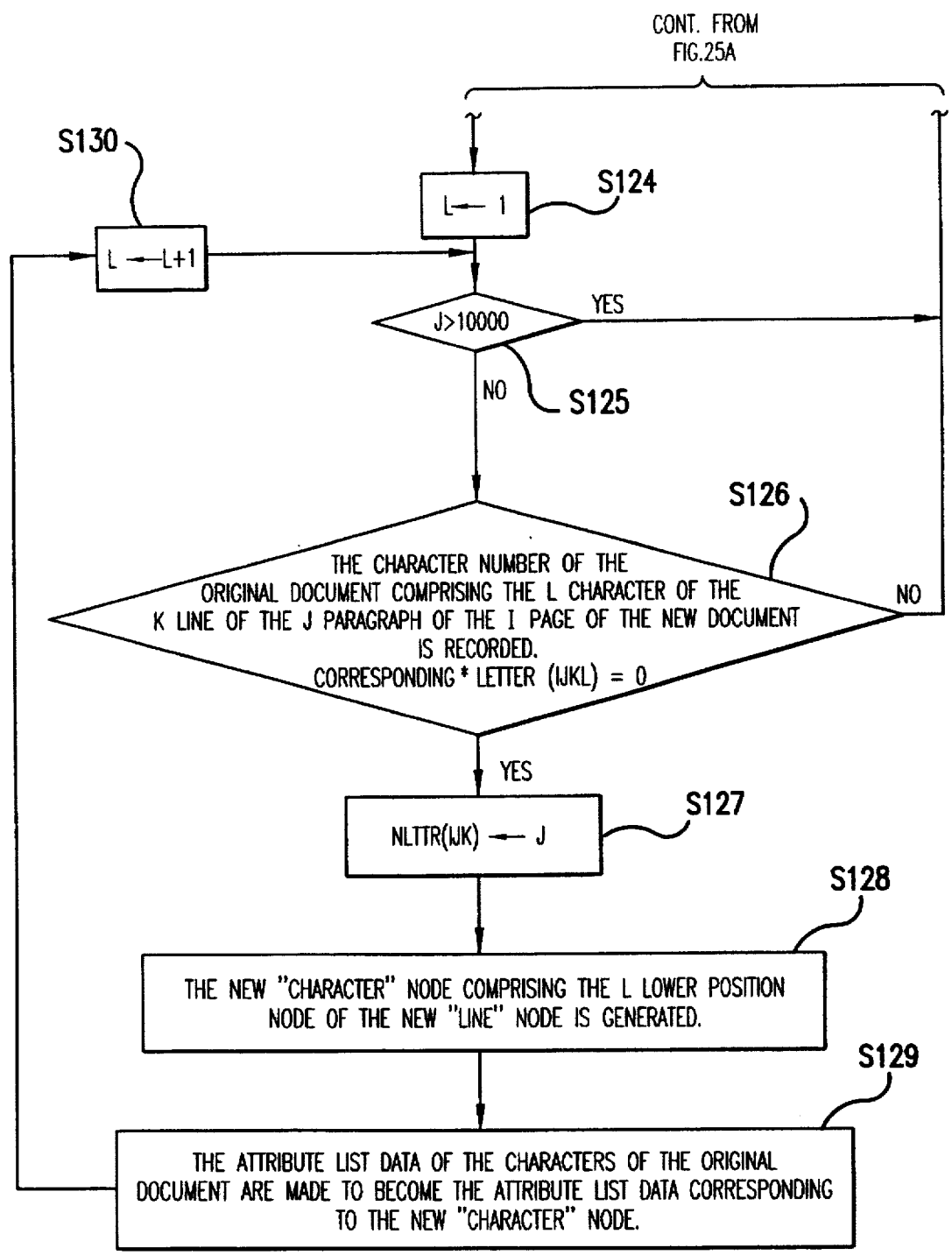

Phase 4 (Steps S104–S131 of FIGS. 24–25)

In the relationship obtained in phase 2 corresponding to the original document revised in phase 3, and the new text composition, the rewriting of the text data, i.e. the rewriting of the structure data and the attribute data is executed. However, in this instance, the already existing text data, i.e. the structure 611 data and the attribute data 612 shown in FIG. 6, since they are not directly converted, newly produces the new compositional node in the new text, and their linkages, using a method whereby the attribute list data corresponding to the individual nodes are reproduced by temporarily copying from the attribute data 612 of FIG. 6.

In phase 4, I represents the parameters controlling the chronological numbers of the new text pages; J represents the parameters controlling the chronological numbers of the new text paragraphs; K represents the parameters controlling the chronological numbers of the new text lines; and L represents the parameters controlling the chronological numbers of the new text characters. In other words, subsequent to phase 4, since rewriting is accomplished whereby I'→I, J'→J, K'→K, and L'→L, then the relationships obtained in phase 2 and phase 3, i.e. the composition of the original prior to division/integration, and the composition of the new document following division/integration, are recorded in the four variables of Corresponding * page (I), Corresponding * paragraph (I J), Corresponding * line (I J K), and Corresponding * letter (I J KL).

First, production is accomplished of the "text" node (i.e. "text 2") of the new document. Second, the page numbers of the original document comprising the I pages of the new document, i.e. the values stored in the variable Corresponding * page (I) (in step S106) are examined. When numbers are recorded, i.e. when the examined values are not empty, then a linkage is provided (in step S108) whereby creation is accomplished (i.e. "page 1", "page 2", . . . ) of the new "page" node as the I lower position node of the new "text" node.

Third, referring to the numbers which are stored in the variable Corresponding * page (I), the attribute data of the original document produced (in step S109) the attribute list data corresponding to the new "page" node by copying the attribute list data from the pages from the attribute data 612 of FIG. 6. For example, when I=1, since the value of Corresponding * page (1) is 1, then the attribute list data (classification: normal size: A4 aspect portrait) corresponding to "page 1" comprising the first page of the original document "document 1" in FIG. 6 becomes the attribute list data corresponding to "page 1" comprising the first page of the new "document 2".

Fourth, with the objective of counting the number of pages composing the new document, substitution is made of the value of I into the variable NPAGE (in step S107). Handling is accomplished in the same manner as described above, with respect to each of the paragraphs, lines, and characters composing the I pages of the new document. In other words, the generation of a new node for each of the "paragraphs", "lines", and "characters" (in steps S115, S122, and S128); a new attribute list data for each "paragraph", "line", and "character" (in steps S116, S123, and S129); as well as a new number count for each of the "paragraphs", "lines", and "characters" (in steps S114, S121, and S127) is accomplished. Once the creation of the new structure data of the I page of the new document and the attribute data has been accomplished, then moving to the creation of the structure data of the (I+1) page of the new document and the attribute data, this type of handling is repeated until the point at which the value of the variable Corresponding * page (I) becomes empty. As a result, along with the completion of the structure data of the new document and the attribute data, the NPAGE, the NPARA (I), and the NLINE (IJ), and the NLTTR (IJK) are obtained.

Figure 26:
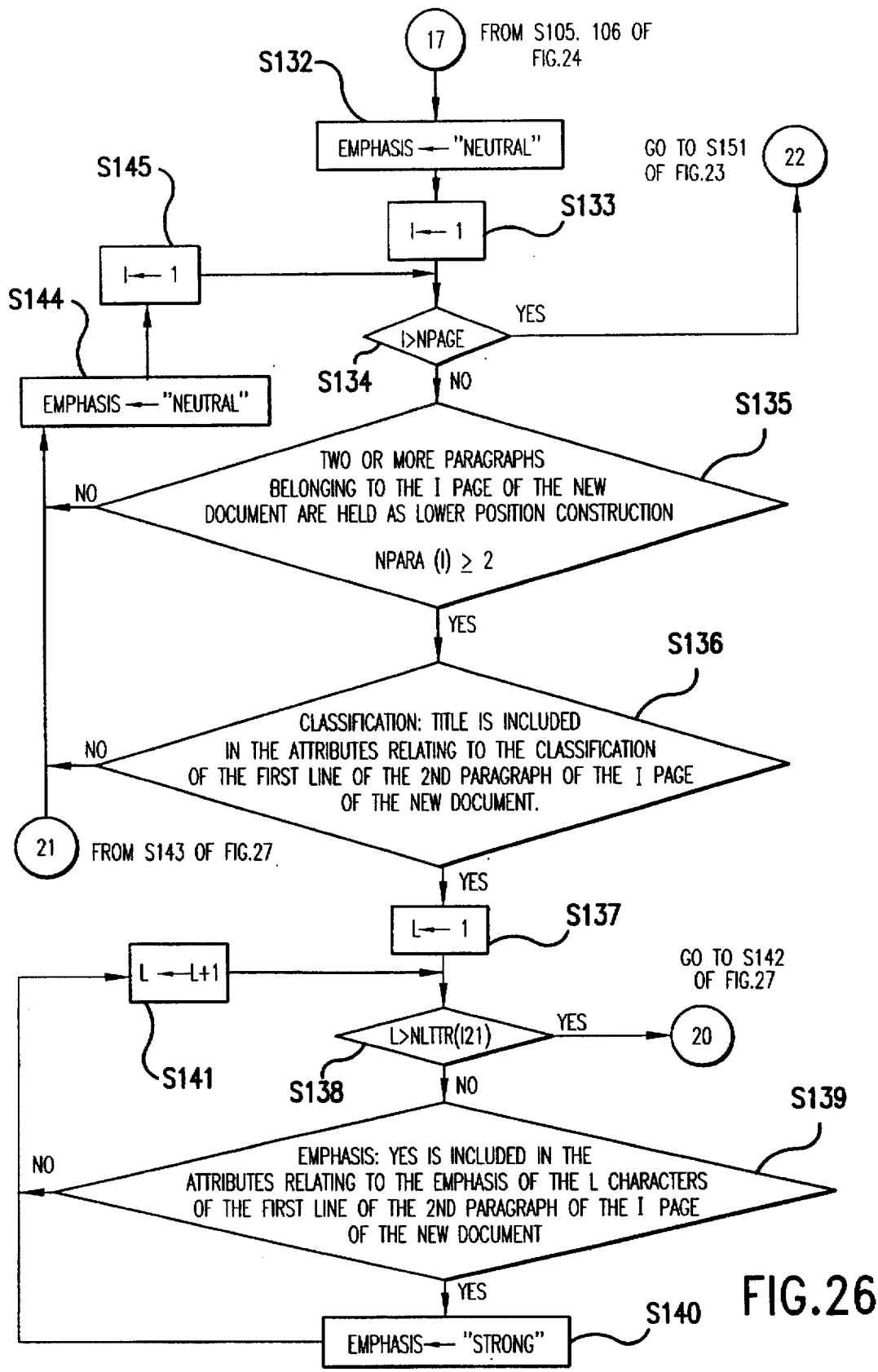
FIG. 26 is a flow chart which shows an example of the conversion rule (phase 5) when the output form is "OHP" in an embodiment of the present invention.
Figure 27:
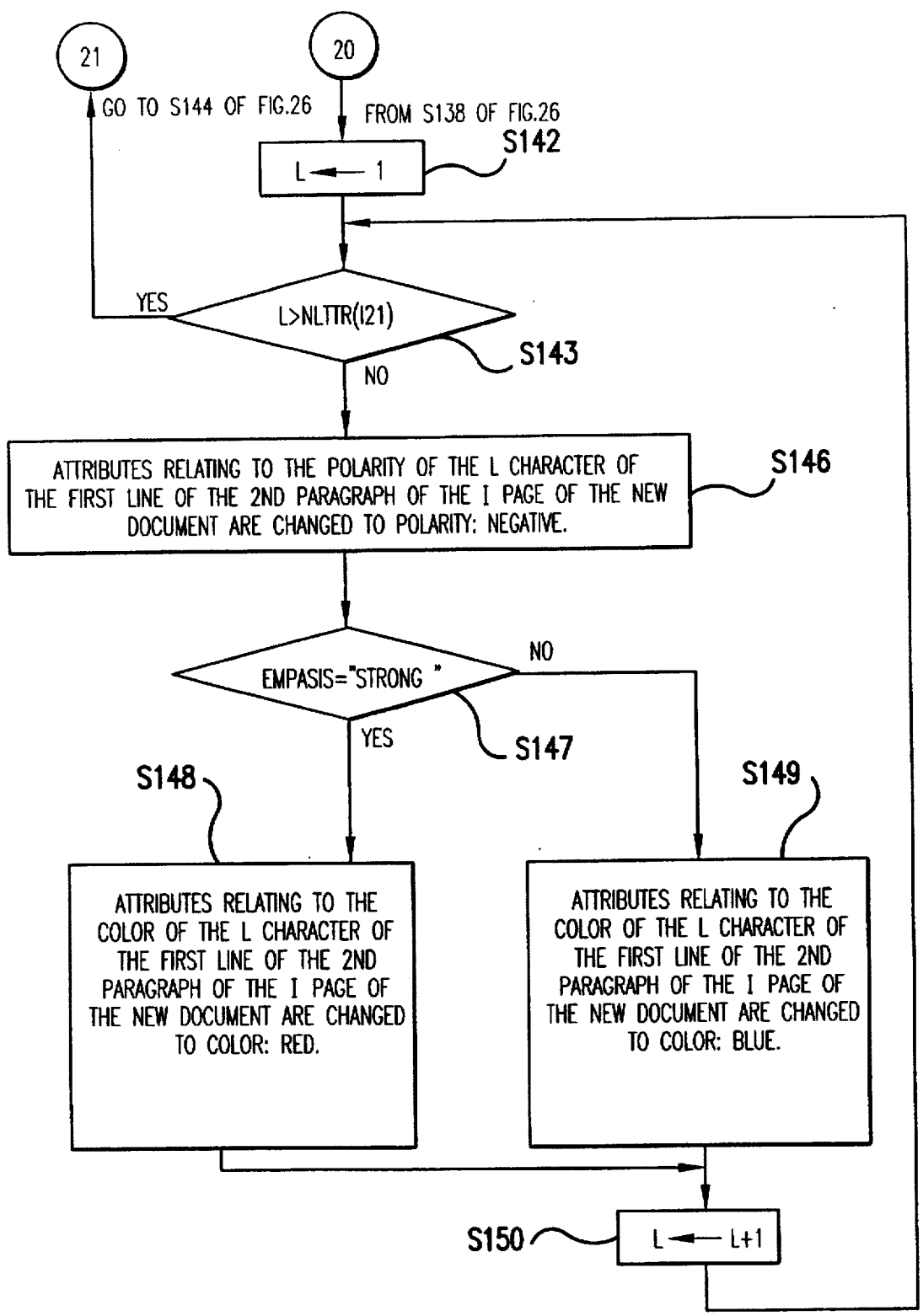
FIGS. 27 and 28 are flow charts which show an example of the conversion rule (phase 5 continuation) when the output form is "OHP" in an embodiment of the present invention.
Figure 28:
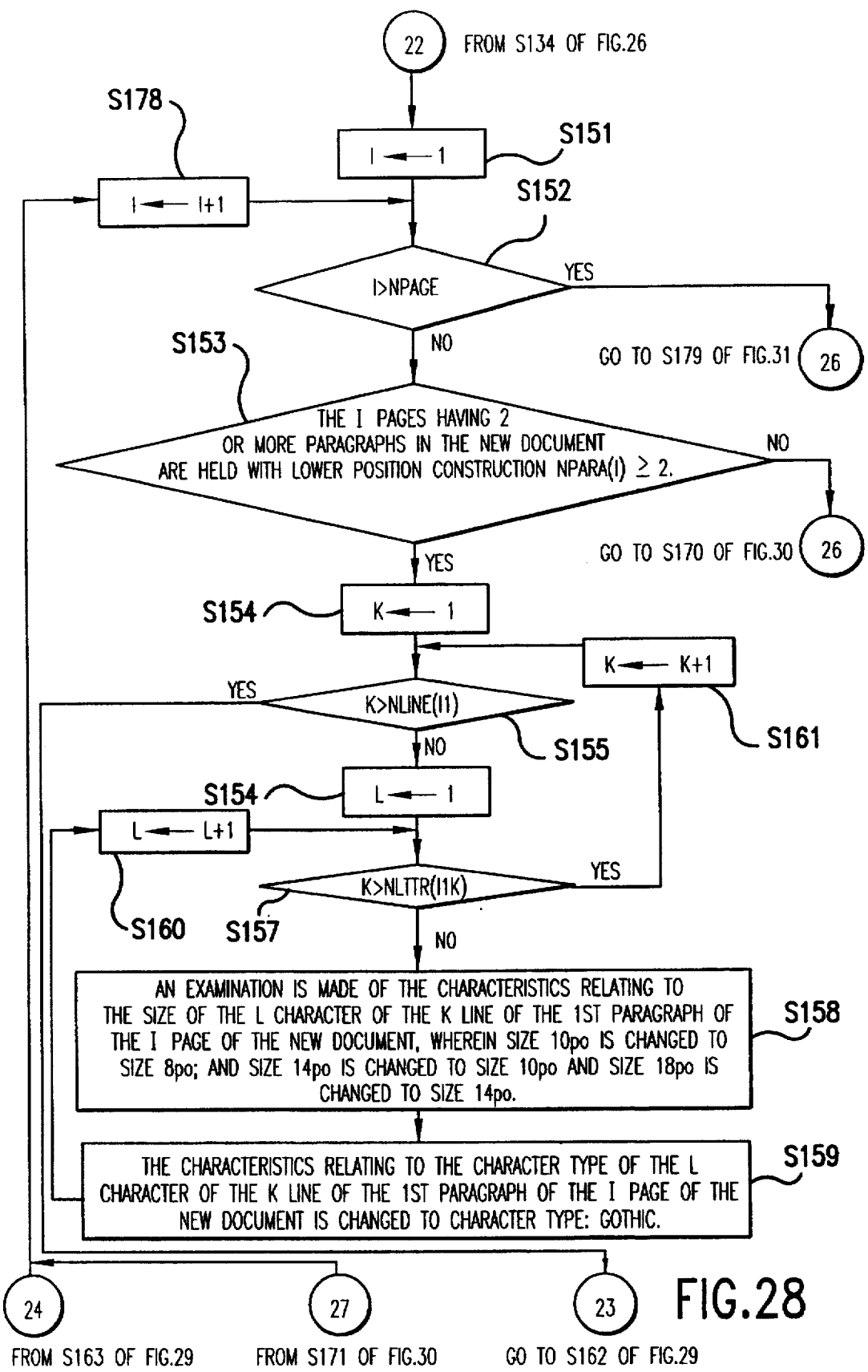
Figure 29:
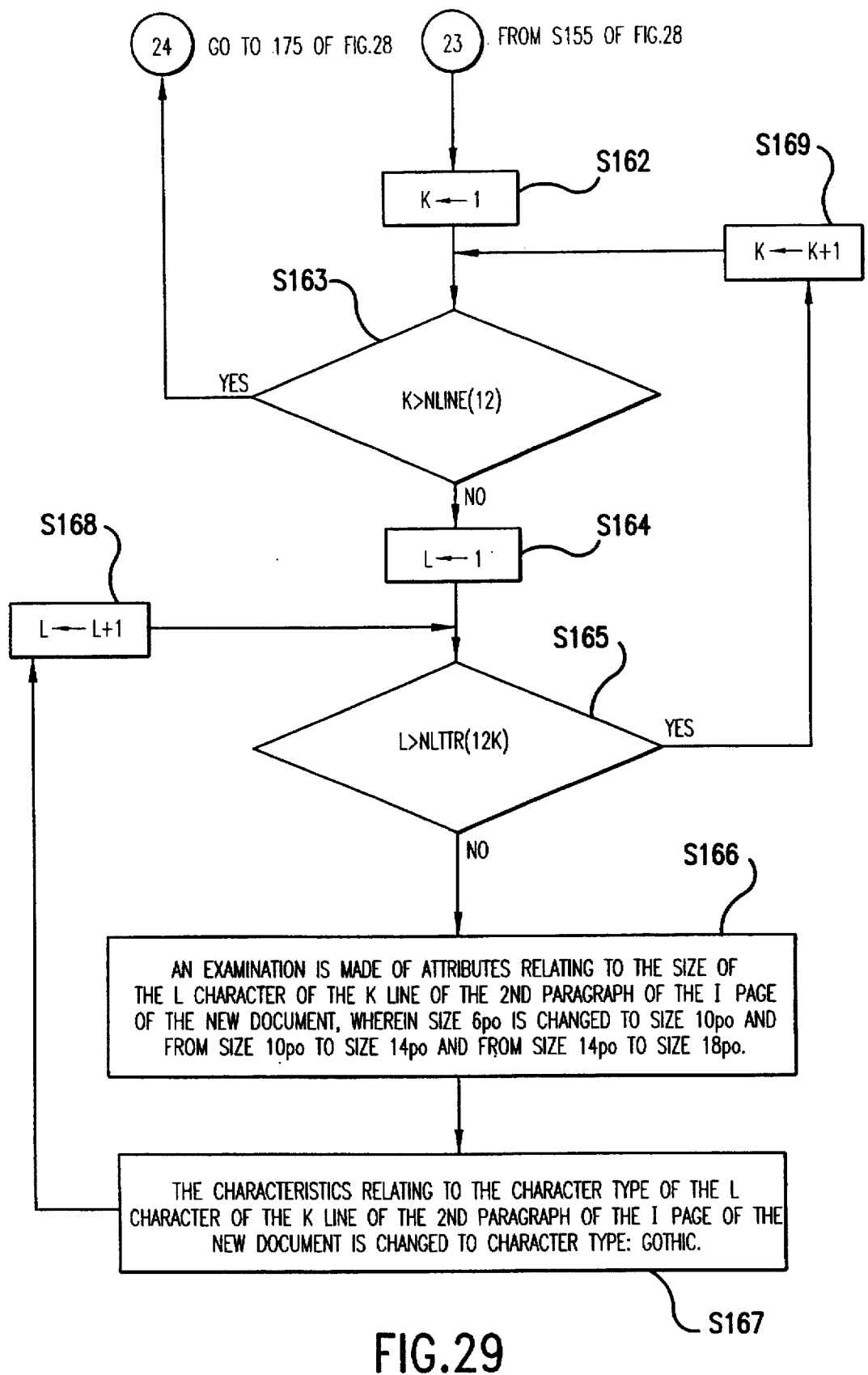
FIG. 29 is a flow chart which shows an example of the conversion rule (phase 5 continuation) when the output form is "OHP" in an embodiment of the present invention.
Figure 30:
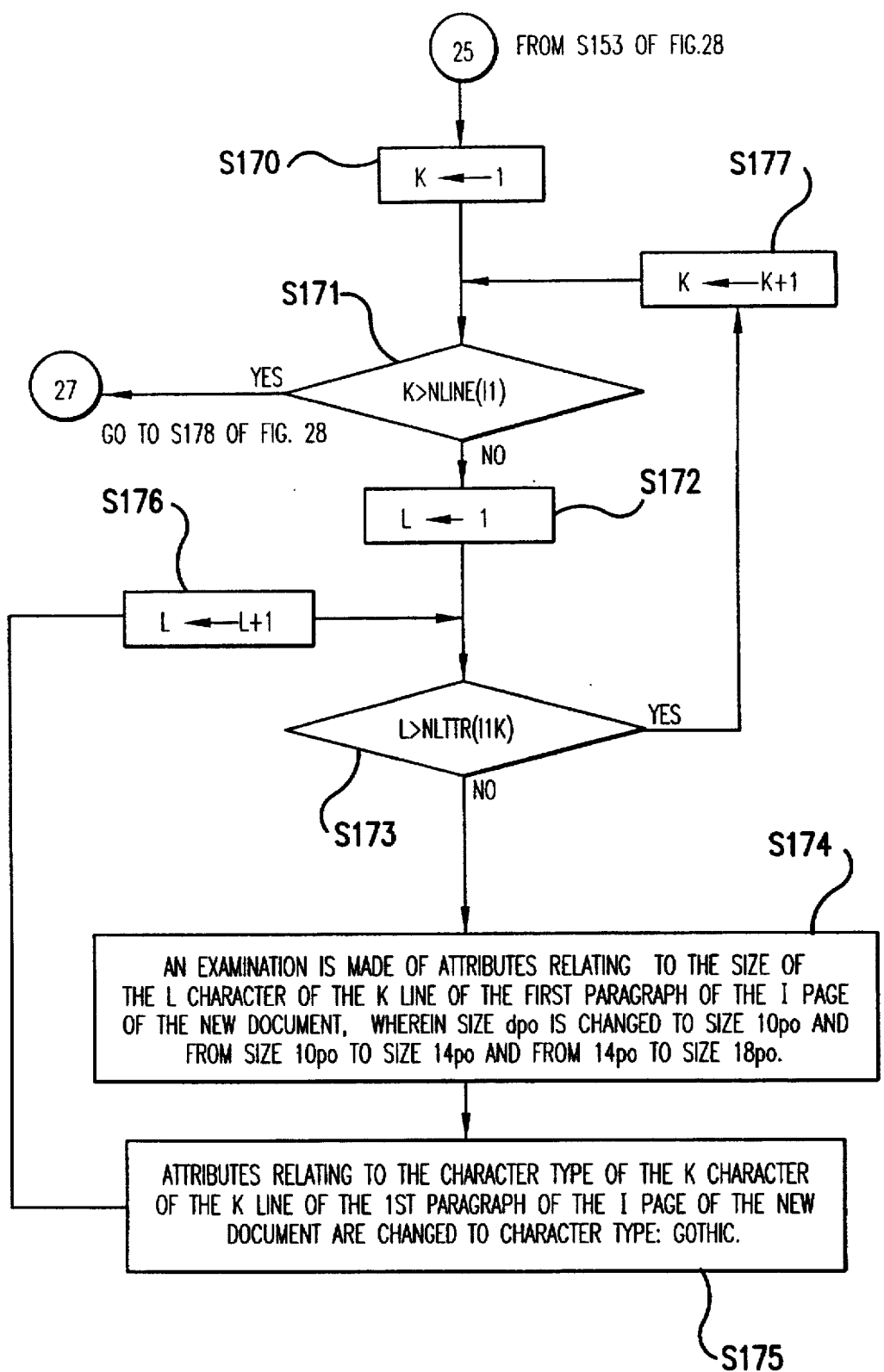
FIG. 30 is a flow chart which shows an example of the conversion rule (phase 5 continuation) when the output form is "OHP" in an embodiment of the present invention.
Figure 31:
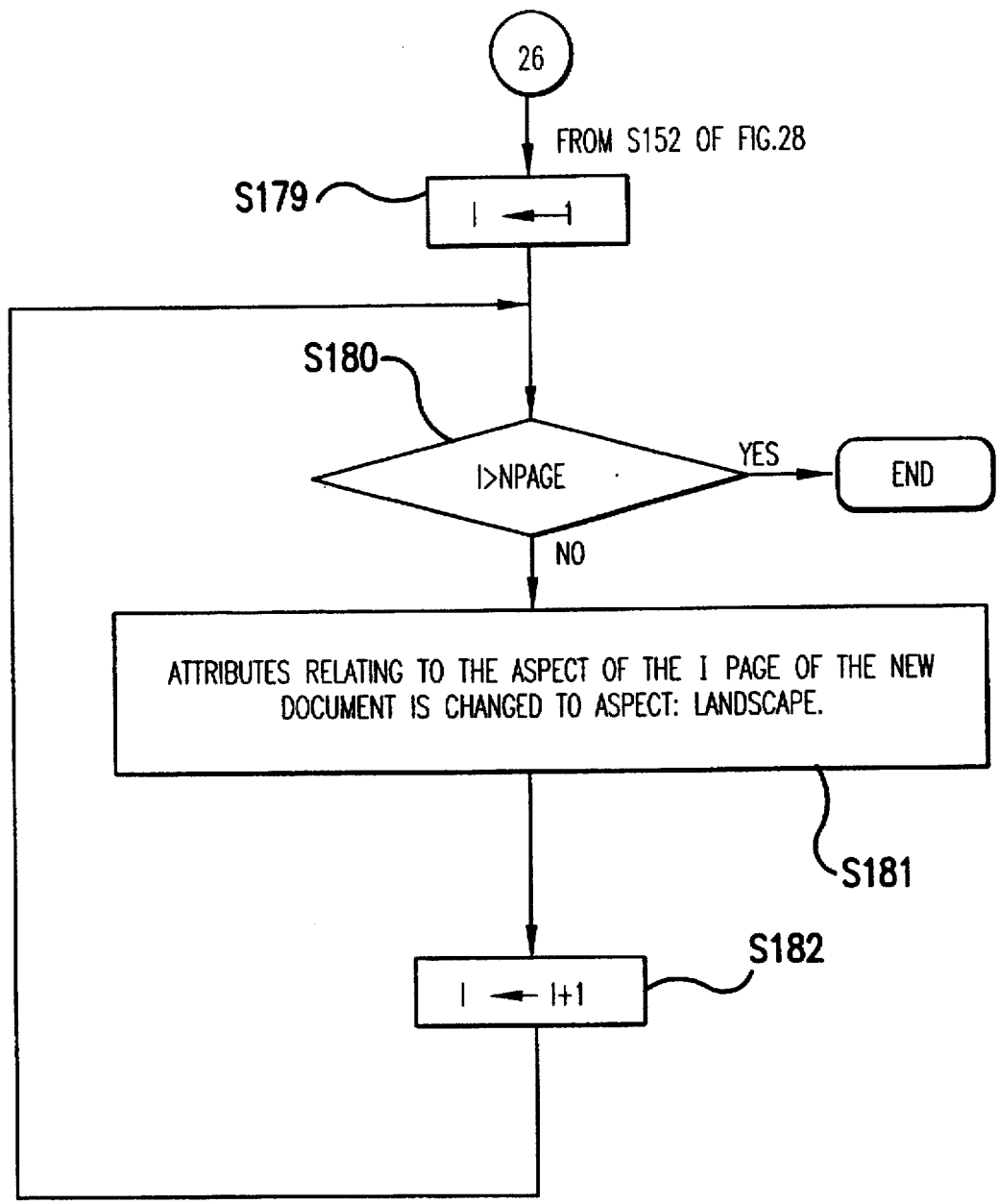
FIG. 31 is a flow chart which shows an example of the conversion rule (phase 5 continuation) when the output form is "OHP" in an embodiment of the present invention.

Phase 5 (Steps S132–S150 of FIGS. 26–27)

By searching the newly produced attribute data, the lower position structure of the second paragraph of all of the pages composing the new document and the attributes can be examined. First, to the extent that two or more lines have lower position structure, and that classification: title is included in the attributes relating to the classification of the first line, and to the extent that there are paragraphs that include emphasis: yes in the attributes relating to the emphasis of >1 character composing the first line, then the attributes relating to the color and polarity of all of the characters composing the first line can be rewritten as color: red and polarity: nega.

On the other hand, if two or more lines have lower case structure and the classification: title is included in the attributes relating to the classification of the first line, and emphasis: yes is not included in any of the attributes relating to the emphasis of the characters of the first line, then the attributes relating to the color and polarity of all of the characters composing the first line can be respectively rewritten as color: blue and polarity: nega.

In phase 5, I represents the parameters controlling the chronological number of pages; K represents the parameters controlling the chronological number of lines; and L represents the parameters controlling the chronological number of characters of the new document. In addition, these parameters are used to control the variables obtained in phase 4, "NPAGE", NPARA (I), NLINE (IJ), and NLTTR (IJK). Furthermore, the EMPHASIS as discriminating parameters to indicate the extent of the emphasis is used. The EMPHASIS is either a "NEUTRAL" value, or a "STRONG" value.

First, an examination is made (in step S135) as to whether or not there is lower position structure to two or more paragraphs of the I page of the new document. Also a determination is made as to whether or not classification: title is included in the attributes relating to the different types of first lines of the second paragraph of the page (in step S136). In fulfilling either of these conditions, execution is accomplished (moving to step S137) as indicated below, and if this is not the case, then the program moves to the next page (eliminating steps S144, and S145).

Second, an examination is made in (step S139) of the attributes of the characters composing the first line of the second paragraph of the page, and if emphasis: yes is included in the attributes relating to emphasis, then the value of "STRONG" in the emphasis is stored (in step S140). When this is not the case, the value of the EMPHASIS is not changed. If the examination of all of the characters composing the first line of the second paragraph of the page is completed, then the rewriting of the attributes of these characters occurs. First, without relation to the value of the EMPHASIS, each of the attributes relating to the polarity of the characters is rewritten as polarity: nega.

Next, when the value of the EMPHASIS is "STRONG", then the attributes relating to the color of each of the characters is rewritten (in step S148) as color: red. When the value of the EMPHASIS is "NEUTRAL", then the characteristics relating to the color of each of the characters is rewritten (in step S149) to color: blue. Upon the completion of a series of rewriting, the program moves to the next page (eliminating the movement to steps S144, S145). In this manner, the printed characters of the title line of the second paragraph of each page of the new document as well as the document data relating to polarity are rewritten.

Phase 6 (steps S151–S182 of FIGS. 28–31)

By searching the newly created attribute data, the attributes of the lower position structure of the paragraphs as well as all of the pages composing the new document can be examined, and the attribute data can be rewritten. In phase 6, I represents the parameters controlling the chronological number of pages of the new document; and J represents the parameters controlling the chronological number of paragraphs of the new document; K represents the parameters controlling the chronological number of lines of the new document; and L represents the parameters controlling the chronological number of characters of the new document. In addition, the variable data obtained in phase 4 of NPAGE, NPARA (I), NLINE (IJ), and NLTTR (IJK) are used as control parameters.

First, the attributes are changed (in step S158) relating to the size of all of the characters composing the first paragraph (in principal the chapter paragraph) of the page comprising the lower position structure of two or more paragraphs. If the size is 10 po it becomes size 8 po, size 14 po becomes size 10 po, and size 18 po becomes size 14 po. The attributes are also changed (in step S166) relating to the size of all of the characters composing the second paragraph (in principal the section paragraph). Size 8 po becomes size 10 po, size 10 po becomes size 14 po, and size 14 po becomes size 18 po.

Where there is a page in which there is only one paragraph, the attributes are changed (in step S174) relating to the size of all of the characters composing the single paragraph. Size 8 po becomes size 10 po, size 10 po becomes size 14 po, and size 14 po becomes size 18 po.

Second, without any relation to the composition of each of the pages, the attributes relating to the character type of all of the characters composing the page are rewritten as character type: gothic (in steps S159, S167, and S175).

Third, without relation to the composition of each of the pages, the attributes are rewritten (in step S181) so that aspect landscape is written for each aspect of the page.

FIG. 10 is a portion of the new document data wherein re-writing is accomplished using the "conversion rule when the output type is "OHP"" as shown in FIGS. 12–13 and FIGS. 17–31. FIG. 10 shows where the underlined items are re-written, (differing from the original data of FIG. 6). Unlike 611 of FIG. 6, in 101 of FIG. 10, the page numbers composing the document are written on p. 2. Notwithstanding the emphasis indications of the user, a portion of the attributes of all of the characters composing the document are re-written from the character type: Ming style shown in FIG. 6, to character type: gothic shown in FIG. 10. To a great extent, these are changed by increasing the number of points. However, it would be an exception to say that this only happens for the attribute value relating to the size of the characters composing the title line of the first paragraph. They may also have small respective point numbers. In addition, a portion of the attributes of the characters composing the title line of the sections, notwithstanding the emphasis indications of the user, are changed from the polarity: positive shown in FIG. 3 to the polarity: negative shown in FIG. 10. Furthermore, when there is some emphasis indicated by the user, then when changing from the color: black, such as is shown in FIG. 6, to the color: red shown in FIG. 10, when no emphasis is indicated by the user, then the color: black shown in FIG. 6 is changed to become the color: blue shown in FIG. 10.

Unlike the conversion rule for when the output type is "paper" of FIG. 12–16, in the conversion rule for when the output type is "OHP" shown in FIG. 12, 13, and 17–31, not only is "the re-writing rule concerning the text element attributes" included, but the "re-writing rule of composition" is also included. For example, in order to easily change the "OHP", since it is desirable for there to be one or two paragraphs on page 1, then when multiple section paragraphs are included on one page of text data of the original document, then the divisions of the content of the page is accomplished. A page having one section paragraph (excluding the paragraph of the chapter title) attached to one page creates document structure with multiple existing pages. In addition, the upper position structure of the section paragraphs divided among multiple pages, are used to create document structure such as, for example, repeating a line or a paragraph including the title, with the objective of showing is as a header on each page.

Furthermore, the application of the conversion rule "conversion rule when the output form is "OHP" is automatically and selectively applied at appropriate places of emphasis as "OHP." In principle, the characters composing the lines other than the title, even when the user wishes to place an emphasis, does not change the color, polarity, or background color, but rather has the same attribute values as the characters of the other lines. In addition, characters that compose the line comprising the title, where the user has provided emphasis input indication, increasing the size and reversing the polarity is made to be a warm color, (for example such as red), for the background to a white character. Where there is no emphasis placed by the user, then a cold color, (such as blue) is provided as the background for white characters.

Figure 11:
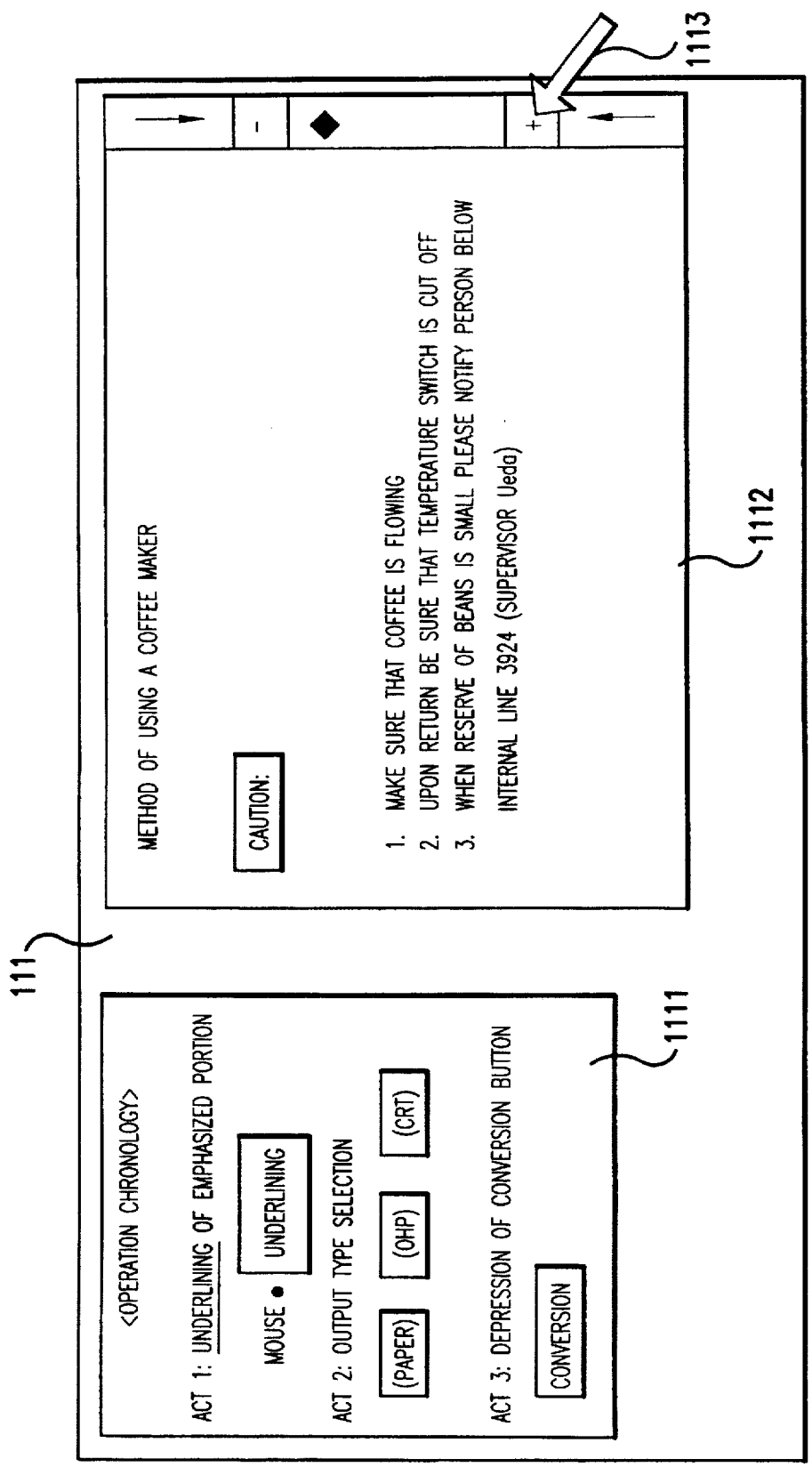
FIG. 11 is a diagram which shows an example of a user interface in an embodiment of the present invention.

New document data that is converted in such a manner is stored within the document data holding component 12. At the same time, a corresponding text picture image is made visual to the user through a text picture image display 15. The document images in the window shown in 912 of FIG. 9, and the document image within the window shown in 1112 of FIG. 11 comprises the new text picture image corresponding to the new document shown in FIG. 8. The number 912 of FIG. 9 comprises the first text picture image of the document. The number 1112 of FIG. 11 comprises the 2nd text picture image of the document. There are many ways of displaying multiple picture image pages. However, in this instance, as shown in FIG. 11, multiple images are displayed of scrolling of the text-picture image through movement of a mouse cursor 1113. Naturally, this is built up and displayed on a window, and the entire form may also be used in compressed form.

As explained in detail above, the text editing device according to the present invention makes possible the providing of a function for automatically executing selection corresponding to differences in the output form of the text, as a means of applying emphasis to locations to be emphasized within the text, without the receipt of detailed input from the user.

What is claimed is:

1. A text editor comprising:
    text data holding means for holding text data that includes emphasis components;
    input indication means for receiving indications of an output type of said text data;
    conversion rule holding means for holding multiple conversion rules for different ways of applying emphasis to said emphasis components included in said text data depending on the output type; and
    text data conversion means for following the indicated output type received from said indication input means, selecting one of said multiple conversion rules corresponding to the output type, and converting said text data according to said selected conversion rule.

2. The text editor according to claim 1 wherein said text data comprisess text elements and attribute data of said text elements, wherein said selected conversion rule converts said attribute data of said text elements corresponding to said emphasis components on the basis of said output type received by said indication input means.

3. The text editor according to claim 1 wherein said output type received by said indication input means is variable.

4. The text editor according to claim 3 wherein said output type is selected from the group including OHP, paper and CRT.

5. A text editor comprising:
    text data holding means for holding text data comprising text elements, which are portions of text, and structure data having a hierarchical relationship between said text elements;
    input indication receiving means for receiving an indication of an output type of said text data;
    conversion rule holding means for holding multiple conversion rules for converting said text data wherein each conversion rule corresponds to an output type; and
    text data conversion means for, following the indication of the output type received from said input indication means, selecting one of said multiple conversion rules corresponding to the output type, and for converting said text data on the basis of the selected conversion rule.

6. The text editor according to claim 5 wherein said text data conversion means converts said structure data.

7. The text editor according to claim 5 wherein said text data conversion means converts one page of said text data into a format selected from the group including one chapter paragraph, one section paragraph, and a combination of one chapter paragraph and one section paragraph located in the chapter paragraph.

8. The text editor according to claim 5, wherein said text data conversion means, while referring to said structure data of said text data held in said text data holding means, detects at least one chapter paragraph held within one page of s aid text data, divides said text data in s aid at least one chapter paragraph, and counts section paragraphs present in each chapter paragraph.

9. The text editor according to claim 8 wherein said text data conversion means detects two or more section paragraphs, divides said text data within said two or more section paragraphs and generates new pages.

10. The text editor according to claim 8 wherein said text data conversion means generates a new page consisting of the chapter paragraph and the section paragraph if a page including one section paragraph follows a page including eone chapter.

11. A method for editing text comprising:
    storing text data having portions with emphasis components;
    selecting an output type for the text;
    selecting a conversion rule for converting the text data to correspond to the selected output type;
    converting the text data to correspond to the selected output type using the selected conversion rule to thereby convert the text in accordance with the converted text data; and
    outputting the converted text.

12. The method according to claim 11 further comprising displaying the converted text through a picture image display.

13. The method according to claim 11 wherein said output types comprise a member selected from the group including OHP, paper and CRT.

14. The method according to claim 11 wherein said conversion rule is selected from multiple conversion rules stored in a conversion holding means.

15. The method according to claim 11 wherein said text data comprises text elements and attribute data for said text elements and wherein said conversion rule converts said attribute data.

16. The method according to claim 11 wherein said text comprises text data including text elements, which are portions of text, and structure data having a hierarchical relationship between said text elements.

17. The method according to claim 16 wherein said structure data is converted during said converting step.

18. The method according to claim 16 further comprising the steps of detecting at least one chapter paragraph held within one page of said text data;

dividing said text data in said at least one chapter paragraph; and calculating section paragraphs present below each chapter.

19. The method according to claim 18 further comprising the steps of:

detecting two or more section paragraphs;

dividing said text data within said two or more section paragraphs; and generating new pages.

20. The method according to claim 18 further comprising the step of generating a new page consisting of the chapter paragraph and the section paragraph if a page including one section paragraph follows a page including one chapter paragraph.

21. The method according to claim 11 further comprising the step of converting one page of text into a format selected from the group including one chapter paragraph, one section paragraph, and a combination of one chapter paragraph and one section paragraph located in the chapter paragraph.

* * * * *